(12) United States Patent
Seki

(10) Patent No.: US 12,182,989 B2
(45) Date of Patent: Dec. 31, 2024

(54) PRINTED MATTER INSPECTION DEVICE, PRINTED MATTER INSPECTION METHOD, PROGRAM, AND PRINTING APPARATUS

(71) Applicant: FUJIFILM Corporation, Tokyo (JP)

(72) Inventor: Masaki Seki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 386 days.

(21) Appl. No.: 17/691,505

(22) Filed: Mar. 10, 2022

(65) Prior Publication Data

US 2022/0198638 A1 Jun. 23, 2022

Related U.S. Application Data

(63) Continuation of application No. PCT/JP2020/033968, filed on Sep. 8, 2020.

(30) Foreign Application Priority Data

Sep. 18, 2019 (JP) ................................ 2019-169310

(51) Int. Cl.
*G06T 7/00* (2017.01)
*B41J 2/015* (2006.01)
(Continued)

(52) U.S. Cl.
CPC .............. *G06T 7/001* (2013.01); *B41J 2/015* (2013.01); *B41J 29/393* (2013.01); *G06T 7/30* (2017.01);
(Continued)

(58) Field of Classification Search
None
See application file for complete search history.

(56) References Cited

U.S. PATENT DOCUMENTS

2006/0203028 A1* 9/2006 Agarwal ................ B41J 29/393
347/19
2008/0284808 A1* 11/2008 Kano ................... B41J 11/0065
347/12
(Continued)

FOREIGN PATENT DOCUMENTS

JP 7-021367 A 1/1995
JP 10-063789 A 3/1998
(Continued)

OTHER PUBLICATIONS

Mehle et al., "Print registration for automated visual inspection of transparent pharmaceutical capsules," Machine Vision and Applications (2016) 27:1087-1102. DOI 10.1007/s00138-016-0797-z (Year: 2016).*

(Continued)

*Primary Examiner* — Soo Shin
(74) *Attorney, Agent, or Firm* — Sughrue Mion, PLLC

(57) ABSTRACT

Provided are a printed matter inspection device, a printed matter inspection method, a program, and a printing apparatus capable of suppressing erroneous detection in detection of a defect occurring in one direction. The printed matter inspection device and the printing apparatus include a print data acquisition unit that acquires print data, an imaging data acquisition unit that acquires imaging data of a printed matter, a registration processing unit that executes registration between the print data and the imaging data by applying a specified registration accuracy, and an inspection processing unit that acquires defect information of the imaging data based on the print data. A learning model that has been learned by using a disturbance-imparted learning data set having, as an input, disturbance-imparted imaging data in which a disturbance that shifts a position of the imaging data in a direction intersecting a relative transport direction between the printing section and the medium in the printing (Continued)

apparatus is imparted, and having defect information as an output is applied to the inspection processing unit.

21 Claims, 15 Drawing Sheets

(51) Int. Cl.
  *B41J 29/393* (2006.01)
  *G06T 7/30* (2017.01)
  *G06V 10/774* (2022.01)

(52) U.S. Cl.
  CPC .............. *G06V 10/7747* (2022.01); *G06T 2207/20081* (2013.01); *G06T 2207/30144* (2013.01)

(56) References Cited

U.S. PATENT DOCUMENTS

| | | | | |
|---|---|---|---|---|
| 2009/0310161 | A1* | 12/2009 | Kawamura | H04N 1/4052 358/1.9 |
| 2010/0231635 | A1* | 9/2010 | Ramakrishnan | B41J 29/393 358/1.9 |
| 2011/0316925 | A1* | 12/2011 | Saita | B41J 2/2142 347/19 |
| 2012/0092409 | A1* | 4/2012 | Wu | B41J 2/2146 347/19 |
| 2012/0154837 | A1* | 6/2012 | Yamazaki | B41J 2/2142 358/1.9 |
| 2019/0236738 | A1* | 8/2019 | Lebel | G06F 18/214 |

FOREIGN PATENT DOCUMENTS

| | | |
|---|---|---|
| JP | 2014-66618 A | 4/2014 |
| JP | 2019-101540 A | 6/2019 |
| WO | 2019/142517 A1 | 7/2019 |

OTHER PUBLICATIONS

International Search Report dated Nov. 24, 2020, issued by the International Searching Authority in application No. PCT/2020/033968.

Written Opinion dated Nov. 24, 2020, issued by the International Searching Authority in application No. PCT/2020/033968.

International Preliminary Report on Patentability dated Mar. 15, 2022, issued by the International Bureau in application No. PCT/2020/033968.

Extended European Search Report issued Sep. 20, 2022 in European Application No. 20865804.7.

Communication issued Jul. 13, 2023 in European Application No. 20 865 804.7.

* cited by examiner

PRINTED MATTER INSPECTION DEVICE, PRINTED MATTER INSPECTION METHOD, PROGRAM, AND PRINTING APPARATUS

CROSS-REFERENCE TO RELATED APPLICATIONS

The present application is a Continuation of PCT International Application No. PCT/JP2020/033968 filed on Sep. 8, 2020 claiming priority under 35 U.S.C § 119(a) to Japanese Patent Application No. 2019-169310 filed on Sep. 18, 2019. Each of the above applications is hereby expressly incorporated by reference, in its entirety, into the present application.

BACKGROUND OF THE INVENTION

1. Field of the Invention

The present invention relates to a printed matter inspection device, a printed matter inspection method, a program, and a printing apparatus.

2. Description of the Related Art

A defect inspection device that inspects a defect of an inspection target by comparing the imaging data obtained by imaging the inspection target with an imaging device such as a scanner with reference data serving as a reference widely used.

As an application of the defect inspection device, there is a printed matter inspection device that inspects a printing defect caused by a streak of printed matter generated by using a printing apparatus, ink loss, and the like. The printed matter inspection device compares the print data input to the printing apparatus with the imaging data obtained by imaging the printed matter that has been printed, and determines the quality of the printed matter on the basis of the presence/absence of a defect in the printed matter.

In a case where the printed matter inspection of comparing the print data and the imaging data is executed, preprocessing is required to match a difference in characteristic between the reference print data serving as a reference and the imaging data serving as an inspection target. In the execution of the preprocessing, there are various conditions such as a difference in data format and a difference in characteristics such as a color profile, the processing is complicated, and a long processing period is required. To solve this problem, deep learning, which has been widely used in recent years, has been utilized to automate parameter setting, feature amount extraction, and the like.

JP1995-126604A (JP-H07-21367A) describes a learning-type image recognition device that outputs a class representing group sorting for an input image. A learned model is applied to the device described in the document. The document discloses a technique of increasing the number of samples by enhancing the learning data lacking in learning. Specifically, in a case where the fluctuation factor of an image is rotation, the device generates a large number of learning sample images in which an input image is rotated on the basis of a specified rotation angle, and executes learning using the learning sample images.

SUMMARY OF THE INVENTION

However, there is a case where a misregistration occurs between the print data and the imaging data. The misregistration between the print data and the imaging data may cause erroneous detection in which a pattern of the printed matter is detected as a defect in a case where no defect is present in the inspection of the printed matter.

Such erroneous detection can be solved by improving the accuracy of the registration between the print data and the imaging data, but this becomes a trade-off between the high accuracy in the registration and the length of a registration processing period. In a case where priority is given to achieving a targeted processing period, a certain decrease in the accuracy of printed matter inspection should be tolerated.

The existing technique described in JP1995-126604A (JP-H07-21367A) that rotates the learning data to enhance the learning data complicates learning in a case where generating a learning model for detecting a defect that occurs in one direction such as a streak, and there is a concern that the performance of the learning model will deteriorate.

The present invention has been made in view of such circumstances, and an object thereof is to provide a printed matter inspection device, a printed matter inspection method, a program, and a printing apparatus capable of suppressing erroneous detection in the detection of a defect occurring in one direction.

In order to achieve the above object, the following invention aspects are provided.

A printed matter inspection device according to a first aspect comprises a print data acquisition unit that acquires print data input to a printing apparatus in a case where a printed matter is generated; an imaging data acquisition unit that acquires imaging data of the printed matter; a registration processing unit that executes registration between the print data and the imaging data by applying a specified registration accuracy; and an inspection processing unit that acquires defect information of the imaging data on the basis of the print data by using the print data and the imaging data on which registration processing has been executed using the registration processing unit. A learning model that has learned a relationship between a defect candidate detected from the imaging data and a defect in the printed matter is applied to the inspection processing unit. The learning model executes the learning by using a disturbance-imparted learning data set having, as an input, disturbance-imparted imaging data in which a disturbance that shifts a position of the imaging data within a range of the registration accuracy in a direction intersecting a relative transport direction between a printing section and a medium in the printing apparatus is imparted, and having defect information of the disturbance-imparted imaging data as an output.

According to the first aspect, the printed matter inspection of detecting a defect in the printed matter is executed by using the learning model that has executed the learning using the disturbance-imparted imaging data in which the disturbance that shifts the position of the imaging data with respect to the print data within the range of registration accuracy between the print data and the imaging data in the direction intersecting the relative transport direction between the printing section and the medium in the printing apparatus is imparted. Accordingly, erroneous detection in the detection of a streak defect occurring in the relative transport direction can be suppressed.

The relative transport direction between the printing section and the medium in the printing apparatus may include a direction in which the medium is moved with respect to the fixed printing section, a direction in which the printing section is moved with respect to the fixed medium, or a relative direction in a case where both are moved.

In a second aspect, in the printed matter inspection device of the first aspect, the learning model may be configured to execute the learning by using the print data in combination as the disturbance-imparted learning data set.

According to the second aspect, the learning model applied to streak defect detection can be generated on the basis of the comparison result between the print data and the imaging data.

In a third aspect, in the printed matter inspection device of the first or second aspect, the learning model may be configured to execute learning using a normal learning data set having the print data and the imaging data as an input and having defect information of the imaging data as an output.

According to the third aspect, the learning based on the imaging data and the print data in which the disturbance is not applied can be executed. Accordingly, the basic performance of the learning model can be improved.

In a fourth aspect, in the printed matter inspection device of any one of the first to third aspects, the imaging data acquisition unit may be configured to acquire data of a printed matter generated by using an ink jet printing apparatus.

According to the fourth aspect, the defect inspection of the printed matter generated by using the ink jet printing apparatus can be executed.

In a fifth aspect, in the printed matter inspection device of the fourth aspect, the inspection processing unit may be configured to acquire defect information representing a defect that occurs in a direction intersecting an arrangement direction of a plurality of nozzles provided in the ink jet printing apparatus, and the learning model may be configured to execute learning using the disturbance-imparted imaging data in which a disturbance that shifts a position of the imaging data in the arrangement direction of the plurality of nozzles is imparted.

According to the fifth aspect, erroneous detection of a streak defect occurring in the direction intersecting the arrangement direction of the plurality of nozzles can be suppressed.

In a sixth aspect, in the printed matter inspection device of the fifth aspect, the learning model may be configured to further execute learning using the disturbance-imparted imaging data in which a change in an image structure of the imaging data with respect to the print data is imparted as a disturbance.

According to the sixth aspect, erroneous detection of a defect caused by the change in the image structure of the printed matter with respect to the print data can be suppressed.

In a seventh aspect, in the printed matter inspection device of the sixth aspect, the learning model may be configured to execute learning using the disturbance-imparted imaging data in which a change in the image structure of the imaging data with respect to the print data caused by correction processing in the printing apparatus is imparted as a disturbance.

According to the seventh aspect, erroneous detection of a defect caused by the change in the image structure of the printed matter with respect to the print data caused by the correction processing in the printing apparatus can be suppressed.

In an eighth aspect, in the printed matter inspection device of the seventh aspect, the learning model may be configured to execute learning using the disturbance-imparted imaging data in which a change in the image structure of the imaging data with respect to the print data caused by jetting failure correction processing of the nozzles is imparted as a disturbance.

According to the eighth aspect, erroneous detection of a defect caused by the change in the image structure of the printed matter with respect to the print data caused by the jetting failure correction processing can be suppressed.

In a ninth aspect, in the printed matter inspection device of any one of the sixth to eighth aspects, the learning model may be configured to execute learning using the disturbance-imparted imaging data in which a change in the image structure of the imaging data with respect to the print data according to a type of network applied to the printing apparatus is imparted as a disturbance.

According to the ninth aspect, erroneous detection of a defect caused by the change in the image structure of the printed matter with respect to the print data that occurs depending on the type of network applied to the printing apparatus can be suppressed.

In a tenth aspect, in the printed matter inspection device of the sixth aspect, the learning model may be configured to execute learning using the disturbance-imparted imaging data in which a change in the image structure of the imaging data with respect to the print data occurred depending on an individual difference of an imaging element provided in an imaging device for generating the imaging data is imparted as a disturbance.

According to the tenth aspect, erroneous detection of a defect caused by the change in the image structure of the imaging data for the printed matter according to the individual difference of the imaging element provided in the imaging device can be suppressed.

In an eleventh aspect, in the printed matter inspection device of the tenth aspect, the learning model may be configured to execute learning using the disturbance-imparted imaging data in which a change in the image structure of the imaging data with respect to the print data according to a change in brightness of the imaging data is imparted as a disturbance.

According to the eleventh aspect, erroneous detection of a defect caused by the change in the image structure of the imaging data for the printed matter according to the change in brightness of the imaging data can be suppressed.

In a twelfth aspect, in the printed matter inspection device of the sixth aspect, the learning model may be configured to execute learning using the disturbance-imparted imaging data in which a change in the image structure of the imaging data with respect to the print data according to a change in brightness of the imaging data according to a difference in a medium is imparted as a disturbance.

According to the twelfth aspect, erroneous detection of a defect caused by the change in the image structure of the imaging data for the printed matter according to the difference in the medium can be suppressed.

The difference in the medium may include both a difference in the type of medium and a difference in an individual medium.

In a thirteenth aspect, in the printed matter inspection device of any one of the sixth to twelfth aspects, the learning model may be configured to execute learning using the disturbance-imparted imaging data in which a change in the image structure of the imaging data with respect to the print data caused by a noise according to a surrounding environment of the printing section is imparted as a disturbance.

According to the thirteenth aspect, erroneous detection of a defect caused by the change in the image structure of the printed matter with respect to the print data caused by the noise according to the surrounding environment of the printing section can be suppressed.

In a fourteenth aspect, in the printed matter inspection device of the thirteenth aspect, the learning model may be configured to execute learning using the disturbance-imparted imaging data in which a change in the image structure of the imaging data with respect to the print data caused by a noise according to an ambient temperature of the printing section as the surrounding environment of the printing section is imparted as a disturbance.

According to the fourteenth aspect, erroneous detection of a defect caused by the change in the image structure of the printed matter with respect to the print data caused by the noise according to the ambient temperature of the printing section can be suppressed.

In a fifteenth aspect, in the printed matter inspection device of the thirteenth or fourteenth aspect, the learning model may be configured to execute learning using the disturbance-imparted imaging data in which a change in the image structure of the imaging data with respect to the print data caused by a noise according to an ambient humidity of the printing section as the surrounding environment of the printing section is imparted as a disturbance.

According to the fifteenth aspect, erroneous detection of a defect caused by the change in the image structure of the printed matter with respect to the print data caused by the noise according to the ambient humidity of the printing section can be suppressed.

In a sixteenth aspect, in the printed matter inspection device of any one of the sixth to fifteenth aspects, the learning model may be configured to execute learning using the disturbance-imparted imaging data in which a change in the image structure of the imaging data with respect to the print data caused by a change in the amount of ink applied to one pixel with respect to a specified amount is imparted as a disturbance.

According to the sixteenth aspect, erroneous detection of a defect in the printed matter caused by an abnormality in the amount of ink can be suppressed.

In a seventeenth aspect, in the printed matter inspection device of any one of the sixth to sixteenth aspects, the learning model may be configured to execute learning using the disturbance-imparted imaging data in which a change in the image structure of the imaging data with respect to the print data caused by a stain on a medium is imparted as a disturbance.

According to the seventeenth aspect, erroneous detection of a defect in the printed matter caused by the stain on the medium can be suppressed.

In an eighteenth aspect, in the printed matter inspection device of any one of the sixth to seventeenth aspects, the learning model may be configured to execute learning using the disturbance-imparted imaging data in which a change in the image structure of the imaging data with respect to the print data caused by an unevenness occurring in the printed matter is imparted as a disturbance.

According to the eighteenth aspect, erroneous detection of a defect in the printed matter caused by the unevenness occurring in the printed matter can be suppressed.

A printed matter inspection method according to a nineteenth aspect is a printed matter inspection method comprising a print data acquisition step of acquiring print data input to a printing apparatus in a case where a printed matter is generated; an imaging data acquisition step of acquiring imaging data of the printed matter; a registration processing step of executing registration between the print data and the imaging data by applying a specified registration accuracy; and an inspection processing step of acquiring defect information of the imaging data on the basis of the print data by using the print data and the imaging data on which registration processing has been executed in the registration processing step. A learning model that has learned a relationship between a defect candidate detected from the imaging data and a defect in the printed matter is applied to the inspection processing step. The learning model executes the learning by using a disturbance-imparted learning data set having, as an input, disturbance-imparted imaging data in which a disturbance that shifts a position of the imaging data within a range of the registration accuracy in a direction intersecting a relative transport direction between a printing section and a medium in the printing apparatus is imparted, and having defect information of the disturbance-imparted imaging data as an output.

According to the nineteenth aspect, the same effects as those of the first aspect can be obtained.

In the nineteenth aspect, the same items as the items specified in the second to eighteenth aspects can be appropriately combined together. In that case, the components that carry the processing and functions specified in the printed matter inspection device can be grasped as the components of the printed matter inspection method that carry the corresponding processing and functions.

Ae program according to a twentieth aspect is a program for causing a computer to realize a print data acquisition function of acquiring print data input to a printing apparatus in a case where a printed matter is generated; an imaging data acquisition function of acquiring imaging data of the printed matter; a registration processing unit that executes registration between the print data and the imaging data by applying a specified registration accuracy; and an inspection processing function of acquiring defect information of the imaging data on the basis of the print data by using the print data and the imaging data on which registration processing has been executed using the registration processing unit. A learning model that has learned a relationship between a defect candidate detected from the imaging data and a defect in the printed matter is applied to the inspection processing function. The learning model executes the learning by using a disturbance-imparted learning data set having, as an input, disturbance-imparted imaging data in which a disturbance that shifts a position of the imaging data within a range of the registration accuracy is imparted in a direction intersecting a relative transport direction between a printing section and a medium in the printing apparatus, and having defect information of the disturbance-imparted imaging data as an output.

According to the twentieth aspect, the same effects as those of the first aspect can be obtained.

In the twentieth aspect, the same items as the items specified in the second to eighteenth aspects can be appropriately combined together. In that case, the components that carry the processing and functions specified in the printed matter inspection device can be grasped as the components of the program that carry the corresponding processing and functions.

A printing apparatus according to a twenty-first aspect is a printing apparatus comprising a print data acquisition unit that acquires print data applied in a case where a printed matter is generated; a transport section that transports a medium in a medium transport direction; a printing section that executes printing based on the print data on the medium transported using the transport section; an imaging data acquisition unit that acquires imaging data of the printed matter; a registration processing unit that executes registration between the print data and the imaging data by applying a specified registration accuracy; and an inspection processing unit that acquires defect information of the imaging data on the basis of the print data by using the print data and the imaging data on which registration processing has been executed using the registration processing unit. A learning model that has learned a relationship between a defect candidate detected from the imaging data and a defect in the printed matter is applied to the inspection processing unit. The learning model executes the learning by using a disturbance-imparted learning data set having, as an input, disturbance-imparted imaging data in which a disturbance that shifts a position of the imaging data within a range of the registration accuracy in a direction intersecting a relative transport direction between the printing section and the medium is imparted, and having defect information of the disturbance-imparted imaging data as an output.

According to the twenty-first aspect, the same effects as those of the first aspect can be obtained.

In the twenty-first aspect, the same items as the items specified in the second to eighteenth aspects can be appropriately combined together. In that case, the components that carry the processing and functions specified in the printed matter inspection device can be grasped as the components of the printing apparatus that carry the corresponding processing and functions.

According to the present invention, the printed matter inspection of detecting a defect in the printed matter is executed by using the learning model that has executed the learning using the disturbance-imparted imaging data in which the disturbance that shifts the position of the imaging data with respect to the print data within the range of registration accuracy between the print data and the imaging data in the direction intersecting the relative transport direction between the printing section and the medium in the printing apparatus is imparted. Accordingly, erroneous detection in the detection of a defect occurring in the medium transport direction can be suppressed.

DESCRIPTION OF THE PREFERRED EMBODIMENTS

Figure 1:
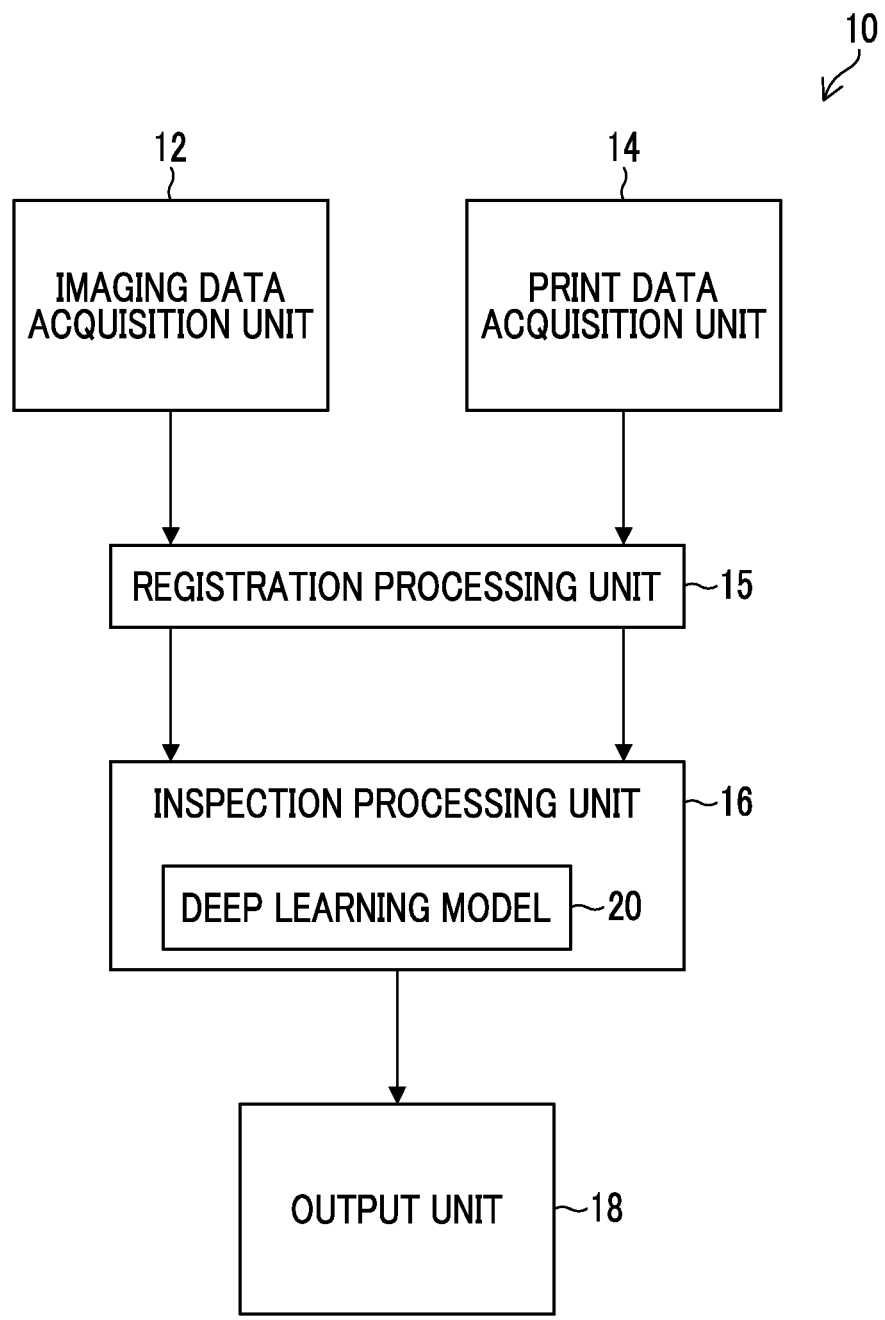
FIG. 1 is a functional block diagram of a printed matter inspection device.

Hereinafter, preferred embodiments of the present invention will be described in detail with reference to the accompanying drawings. In the present specification, the same components will be denoted by the same reference numerals, and overlapping descriptions thereof will be appropriately omitted.

Printed Matter Inspection Device

Overall Configuration

FIG. 1 is a functional block diagram of a printed matter inspection device. The printed matter represents a paper in a state where printing is executed on the paper and an image is formed in a print region of the paper. The printed matter may include paper P that has undergone post-processing such as drying processing. In addition, the paper is shown with reference numeral P in FIG. 4.

The printed matter inspection device 10 comprises an imaging data acquisition unit 12, a print data acquisition unit 14, a registration processing unit 15, an inspection processing unit 16, and an output unit 18. The printed matter inspection device 10 outputs defect information of the printed matter that is an inspection target.

The imaging data acquisition unit 12 captures an image of the printed matter printed by the printing apparatus, using the imaging device, and generates the imaging data of the printed matter. A scanner may be applied as the imaging device. Bitmap format digital data or the like may be applied to the imaging data.

The print data acquisition unit 14 acquires print data. The print data is the digital data input to the printing apparatus in a case where the printed matter is generated by using the printing apparatus. Examples of the print data include RIP data, PDF format digital data, and TIFF format digital data. In addition, RIP is an abbreviation for Raster Image Processor. PDF is an abbreviation for Portable Document Format. TIFF is an abbreviation for Tagged Image File Format.

The registration processing unit 15 executes registration processing between the print data and the imaging data. Known processing may be applied as the registration processing. The registration processing unit 15 transmits the data after the registration processing to the inspection processing unit 16.

The inspection processing unit 16 executes the inspection processing of using the imaging data and the print data as input and comparing the imaging data with the print data to generate defect information of the printed matter. At least one of the presence/absence of a defect, the position of the defect, or the recognition intensity value of the defect may be applied as the defect information of the printed matter.

The inspection processing unit 16 may apply the deep learning model 20. The deep learning model 20 has a plurality of layer structures. The deep learning model 20 holds a plurality of weight parameters corresponding to the plurality of layers.

The deep learning model 20 may update a weight parameter from an initial value to an optimal value and change from an unlearned model to a learned model. The deep learning model 20 may execute re-learning on the learned model. In addition, the deep learning model described in the embodiment corresponds to an example of a learning model.

The output unit 18 outputs the defect information of the printed matter as a result of the printed matter inspection. A visual output form may be applied as the output unit 18. An example of the visual output form includes an aspect in which character information or the like representing the defect information is displayed on a display device. An auditory output form may be applied as the output unit 18. An example of an auditory output form includes an audio output representing the defect information.

Deep Learning Model

Figure 2:
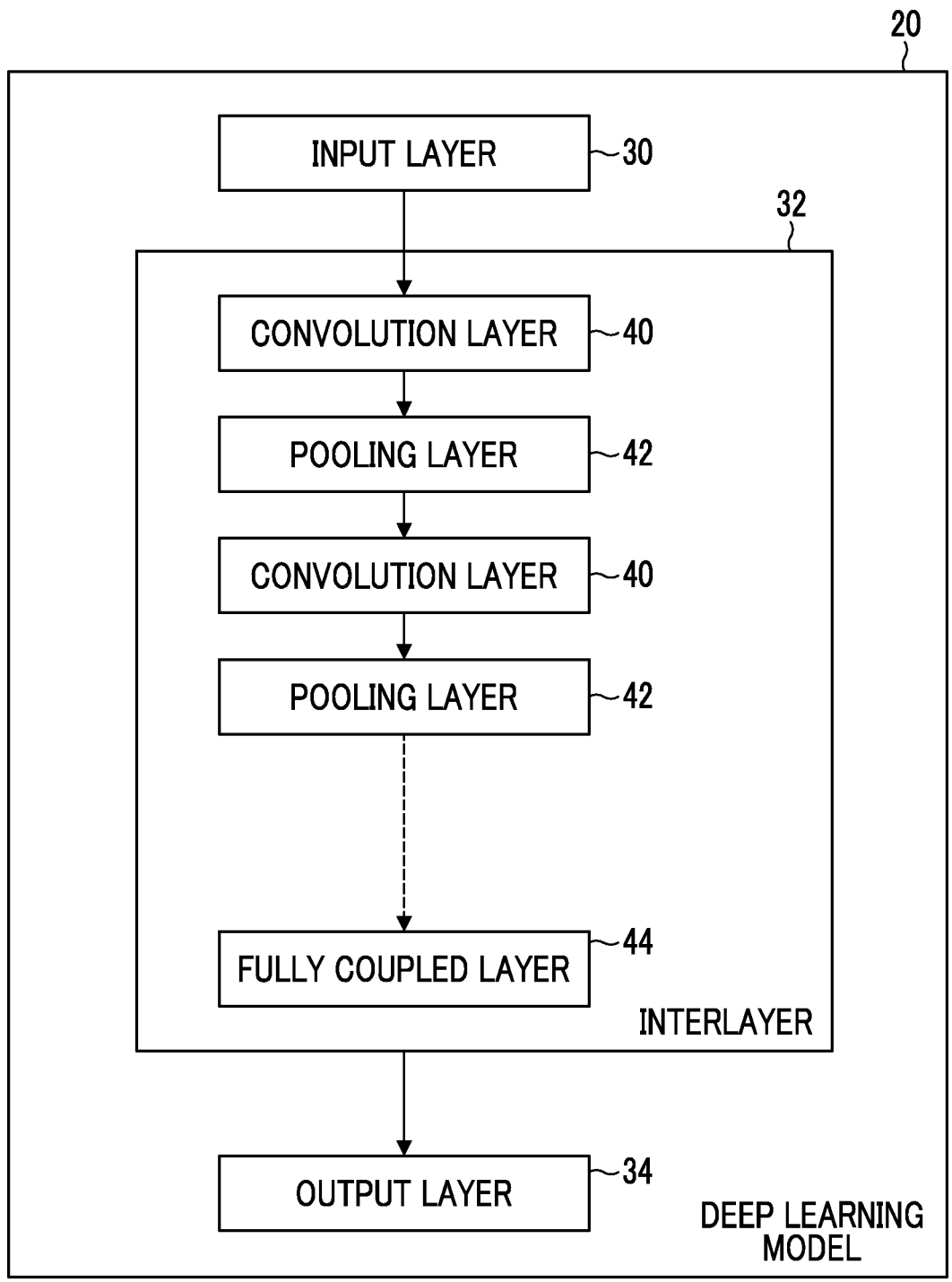
FIG. 2 is an explanatory diagram of a deep learning model applied to an inspection processing unit shown in FIG. 1.

FIG. 2 is an explanatory diagram of the deep learning model applied to the inspection processing unit shown in FIG. 1. FIG. 2 shows a convolutional neural network as an example of the deep learning model. A convolutional neural network may be referred to as a convolutional neural network (CNN).

The deep learning model 20 includes an input layer 30, an interlayer 32, and an output layer 34. The input layer 30, the interlayer 32, and the output layer 34 each have a structure in which a plurality of nodes are connected to each other by using edges.

The interlayer 32 includes a plurality of sets including a convolution layer 40 and a pooling layer 42 as one set. The interlayer 32 includes a fully coupled layer 44. The interlayer 32 extracts features from the imaging data and print data input via the input layer 30. The interlayer 32 compares the features of the imaging data with the features of the print data to detect defects in the printed matter.

The convolution layer 40 executes a convolution operation using a filter having a specified filter size with respect to nearby nodes in the previous layer to generate a feature map. The convolution layer 40 carries a role of feature extraction such as edge extraction from the imaging data and print data.

The pooling layer 42 reduces the feature map output from the convolution layer 40 by applying a specified pooling size to generate a new feature map. The pooling layer 42 carries a role of imparting robustness such that the extracted features are not affected by translation or the like. The fully coupled layer 44 couples all the nodes of the immediately preceding layer.

The interlayer 32 is not limited to a case where the convolution layer 40 and the pooling layer 42 are a set, and the convolution layer 40 may be continuous. Additionally, the interlayer 32 may include a normalized layer.

The output layer 34 outputs printed matter inspection results including the defect information of the printed matter. In a case where the deep learning model 20 classifies the presence/absence of defects in the printed matter, scores respectively corresponding to the defect presence and defect absence may be output as the defect information. The total scores are 100 percent.

In the present embodiment, the convolutional neural network is exemplified as the deep learning model 20, but a learning model capable of extracting features from optional image data may be applied as the deep learning model 20.

Procedure of Printed Matter Inspection Method

Figure 3:
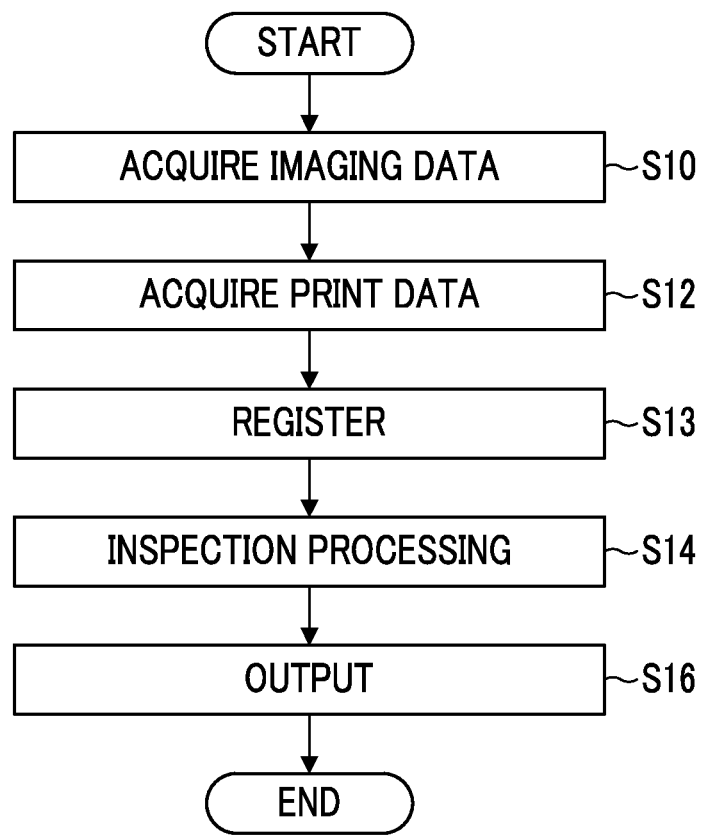
FIG. 3 is a flowchart showing a procedure of a printed matter inspection method applied to the printed matter inspection device shown in FIG. 1.

FIG. 3 is a flowchart showing a procedure of a printed matter inspection method applied to the printed matter inspection device shown in FIG. 1. In an imaging data acquisition step S10, the imaging data acquisition unit 12 shown in FIG. 1 acquires imaging data. After the imaging data acquisition step S10, the process proceeds to a print data acquisition step S12.

In the print data acquisition step S12, the print data acquisition unit 14 acquires print data. After the print data acquisition step S12, the process proceeds to a registration processing step S13. In addition, the print data acquisition step S12 may be executed before the execution of the imaging data acquisition step S10 or may be executed during the execution of the imaging data acquisition step S10.

In the registration processing step S13, the registration processing unit 15 executes the registration processing between the print data and the imaging data. After the registration processing step S13, the process proceeds to an inspection processing step S14.

In the inspection processing step S14, the inspection processing unit 16 identifies the presence/absence of defects in the printed matter on the basis of the comparison result between the imaging data and the print data, and generates defect information. After the inspection processing step S14, the process proceeds to an output step S16.

In the output step S16, the output unit 18 outputs the defect information of the printed matter as an inspection result. After the inspection result is output in the output step S16, the printed matter inspection device 10 ends the printed matter inspection method.

Figure 4:
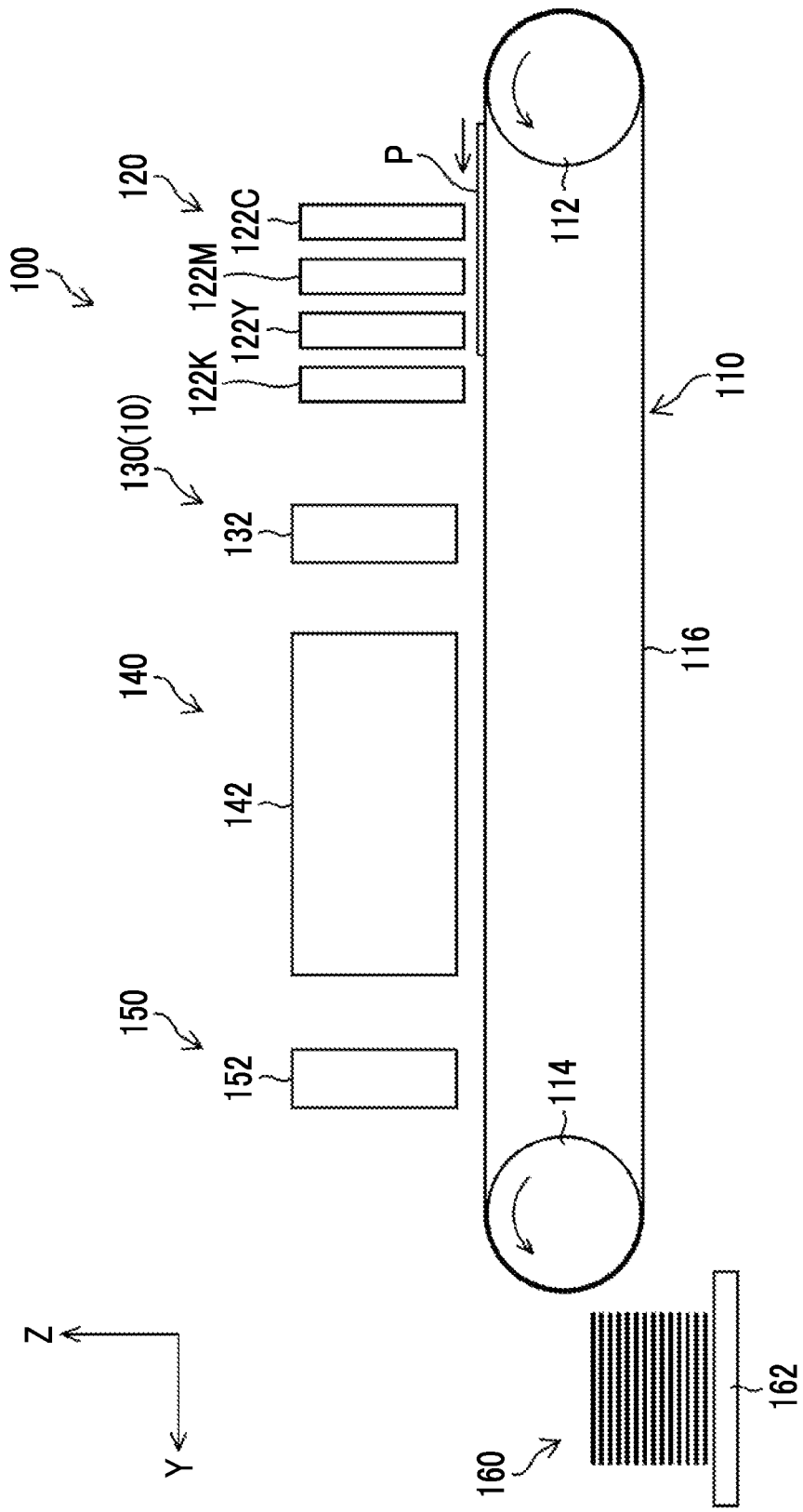
FIG. 4 is an overall configuration diagram of a printing apparatus including the printed matter inspection device shown in FIG. 1.

Configuration Example of Printing Apparatus Including Printed Matter Inspection Device Overall Configuration FIG. 4 is an overall configuration diagram of a printing apparatus including the printed matter inspection device shown in FIG. 1. In the present embodiment, as the printing apparatus 100, an ink jet printing apparatus in which an ink jet method is applied will be exemplified. The reference numeral Y shown in FIG. 4 indicates a transport direction of the paper P. Reference numeral Z represents a vertically upward direction. The same applies to the following description. In addition, in the following description, the transport direction of the paper P may be described as a paper transport direction. The paper transport direction described in the embodiment corresponds to an example of a medium transport direction.

The printing apparatus 100 comprises a transport section 110, a printing section 120, an imaging section 130, a drying section 140, a sorting section 150, and a paper ejection section 160. The printing apparatus 100 prints a color image on the paper P to generate a printed matter.

Transport Section

The transport section 110 transports the paper P fed from a paper feed unit in the paper transport direction. The transport section 110 comprises a driven roller 112, a drive roller 114, and a transport belt 116. In addition, the illustration of the paper feed unit is omitted.

The drive roller 114 has a rotating shaft extending in the horizontal direction, and the rotating shaft is rotatably supported. The driven roller 112 has a rotating shaft parallel to the rotating shaft of the driving roller 114, and the rotating shaft is rotatably supported. In addition, the illustration of the rotating shaft of the drive roller 114 and the rotating shaft of the driven roller 112 is omitted.

A stainless steel endless belt may be applied as the transport belt 116. Accordingly, the flatness of the paper P can be kept good. The transport belt 116 is bridged between the drive roller 114 and the driven roller 112.

The rotating shaft of the drive roller 114 is connected to a rotating shaft of a motor. In response to the rotation of the motor, the drive roller 114 rotates counterclockwise in FIG. 4. The driven roller 112 rotates counterclockwise in the figure in accordance with the rotation of the drive roller 114. Depending on the rotation of the driven roller 112 and the driving roller 114, the transport belt 116 travels along a traveling path between the driven roller 112 and the driving roller 114. In addition, the illustration of the motor is omitted.

The paper P supplied from the paper feed unit is placed on a transport surface of the transport belt 116. The transport section 110 transports the paper P placed on the transport belt 116 along a transport path from the driven roller 112 to the drive roller 114 and delivers the paper P to the paper ejection section 160. In the transport path of the paper P, the paper P is transported while a print surface thereof is held horizontally at positions facing each of the printing section 120, the imaging section 130, the drying section 140, and the sorting section 150.

A plurality of suction holes are formed in the transport belt 116. Suction is performed through the plurality of suction holes using a pump. Accordingly, the paper P placed on the transport surface of the transport belt 116 can be suctioned and held on the transport surface. In addition, the illustration of the plurality of suction holes and the pump is omitted.

Printing Section

The printing section 120 executes printing on the paper P on the basis of the print data and generates a printed matter. The printing section 120 comprises an ink jet head 122C, an ink jet head 122M, an ink jet head 122Y, and an ink jet head 122K. The ink jet head 122C executes printing using cyan ink.

Similarly, the ink jet head 122M, the ink jet head 122Y, and the ink jet head 122K execute printing using magenta ink, yellow ink, and black ink, respectively.

The ink jet head 122C, the ink jet head 122M, the ink jet head 122Y, and the ink jet head 122K are respectively disposed at regular intervals along the transport path of the paper P supported using the transport belt 116.

The ink jet head 122C, the ink jet head 122M, the ink jet head 122Y, and the ink jet head 122K are respectively disposed in the above order in the paper transport direction. In addition, the disposition order of the ink jet head 122C and the like is not limited to the above.

Imaging Section

The imaging section 130 images the printed paper P. The imaging section 130 is disposed at a position on the downstream side of the printing section 120 in the paper transport direction. The imaging section 130 comprises a scanner 132. The scanner 132 optically reads an image printed on the paper P and generates the imaging data of the printing image.

The scanner 132 comprises an imaging device that converts an optical image of the printing image into electrical signals. A CCD image sensor, a CMOS image sensor, or the like may be applied as the imaging device. In addition, CCD is an abbreviation for Charge-Coupled Device. Additionally, CMOS is an abbreviation for Complementary Metal Oxide Semiconductor.

The scanner 132 comprises an illumination device and a signal processing circuit. The illumination device comprises a light source and an optical system. The illumination device irradiates an imaging target with illumination light. The signal processing circuit executes signal processing such as noise removal and amplification on output signals of the imaging device. In addition, the illustration of the imaging device, the illumination device, and the signal processing circuit is omitted.

The imaging data acquired by the imaging section 130 may be utilized for the correction of the printing section 120, the detection of defects in the image printed on the paper P, and the like. That is, the imaging section 130 functions as a component of the printed matter inspection device. In addition, the printed paper P has the same meaning as the printed matter. The same applies to the following description.

Drying Section

The drying section 140 executes drying processing on the printed matter. The drying section 140 is disposed at a position on the downstream side of the imaging section 130 in the paper transport direction. The drying section 140 comprises a heater 142.

A halogen heater, an infrared heater, or the like may be applied as the heater 142. The heater 142 heats the printed matter and dries the printed matter. The drying section 140 may comprise a blowing device such as a fan and a blower.

Sorting Section

The sorting section 150 sorts the printed matter depending on the inspection result of the printed matter. The sorting section 150 is disposed at a position on the downstream side of the drying section 140 in the paper transport direction. The sorting section 150 comprises a stamper 152.

The stamper 152 executes stamping processing for depositing ink to a tip edge of a defective printed matter depending on the inspection result of the printed matter. Instead of the stamping processing using the stamper 152, the processing of attaching a sticky note to a defective printed matter may be applied.

Paper Ejection Section

The paper ejection section 160 collects the printed matter. The paper ejection section 160 is disposed at a position on the downstream side of the sorting section 150 in the paper transport direction and at an end point position of the transport path of the transport section 110. The paper ejection section 160 comprises a paper ejection tray 162.

The printed matter is stacked and placed on the paper ejection tray 162. The paper ejection tray 162 comprises a leading paper pad, a trailing paper pad, and a lateral paper pad. The paper ejection tray 162 adjusts the position and orientation of the printed matter and stacks the printed matter.

The paper ejection tray 162 may comprise an elevating device. The elevating device is disposed such that the paper ejection tray 162 can be elevated and lowered. The elevating device controls elevating and lowering in conjunction with an increase/decrease of the printed matter loaded on the paper ejection tray 162. Accordingly, the printed matter at the highest position among the printed matter loaded on the paper ejection tray 162 is always located at a specified height.

Paper Applied to Printing Apparatus

A paper medium such as printing paper may be applied as the paper P. As the paper P, a medium using a material other than paper, such as a film-like resin and a film-like metal, may be applied. The paper P may be referred to as a printing medium, a recording medium, or the like.

Functional Block of Printing Apparatus

Figure 5:
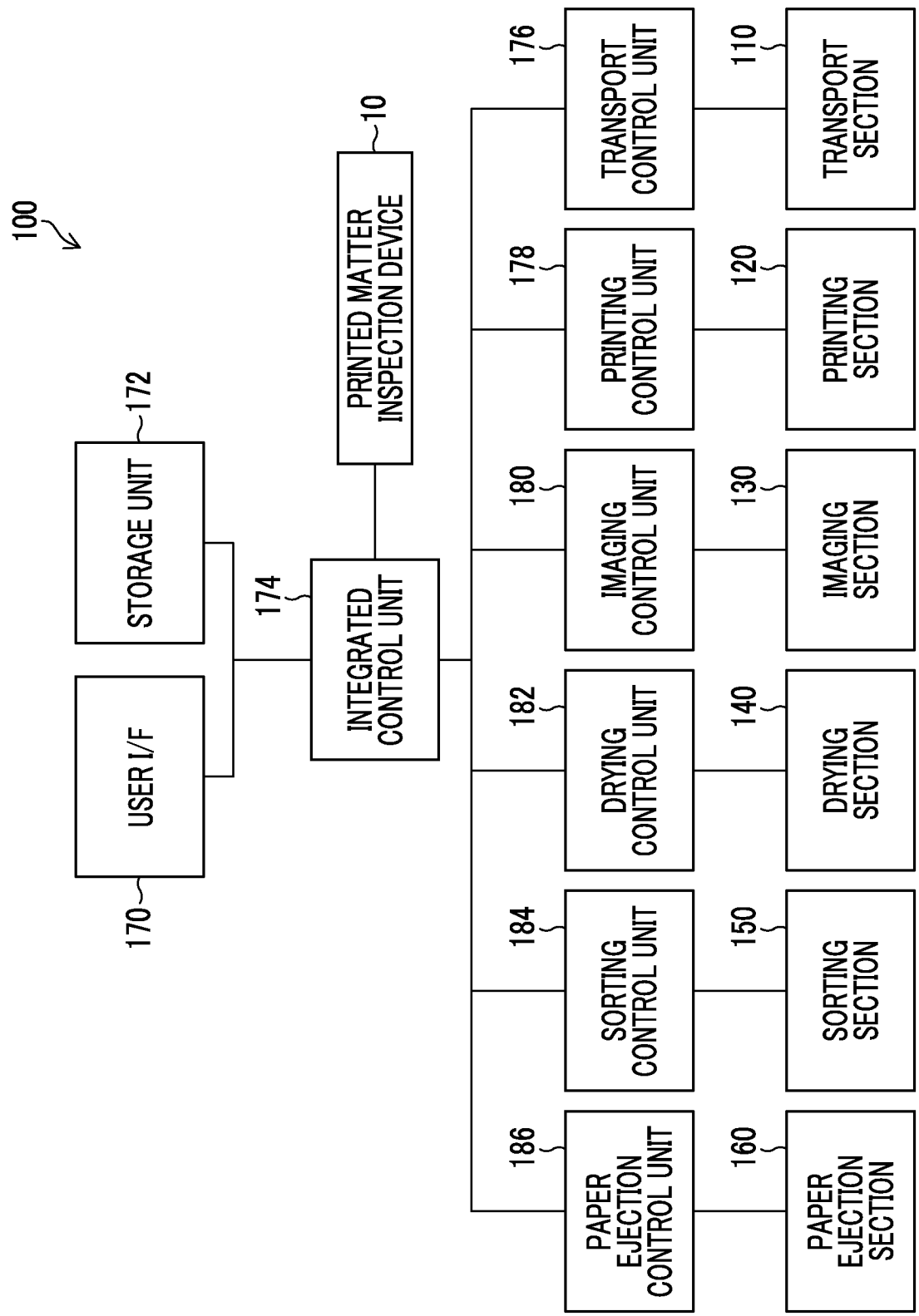
FIG. 5 is a functional block diagram of the printing apparatus shown in FIG. 4.

FIG. 5 is a functional block diagram of the printing apparatus shown in FIG. 4. The printing apparatus 100 comprises a user interface 170 and a storage unit 172. The printing apparatus 100 comprises an integrated control unit 174, a transport control unit 176, a printing control unit 178, an imaging control unit 180, a drying control unit 182, a sorting control unit 184, and a paper ejection control unit 186.

The user interface 170 comprises an input unit and a display unit. The input unit comprises an operation panel used when an operator inputs various information. The various information to be referred to by the operator is displayed on the display unit. A display device may be applied as the display unit. In addition, the illustration of the input unit and the display unit are omitted.

The storage unit 172 stores a program applied to the control of the printing apparatus 100, various parameters necessary for executing the program, and the like. A magnetic recording medium such as a hard disk and a non-temporary recording medium such as a semiconductor recording medium may be applied as the storage unit 172.

The integrated control unit 174 integrally controls the overall operation of the printing apparatus 100 by using the program and various parameters read out from the storage unit 172. That is, the integrated control unit 174 transmits a command signal indicating the content of control to each control unit.

The transport control unit 176 controls the operation of the transport section 110 on the basis of the command signal transmitted from the integrated control unit 174. The transport control unit 176 controls the paper feed and paper ejection of the paper P and the transport speed of the paper P. In addition, the speed referred to here may include the concept of speed representing the absolute value of speed. The same applies to the following description.

The printing control unit 178 controls the operation of the printing section 120 on the basis of the command signal transmitted from the integrated control unit 174. The printing control unit 178 comprises an image processing unit. The image processing unit executes image processing such as color separation processing, correction processing, and halftone processing on the print data. Various corrections such as gamma correction and density correction may be applied as the correction processing.

The printing control unit 178 refers to jetting failure nozzle information and executes jetting failure correction processing of the ink jet head 122C and the like. In the jetting failure correction processing, alternative dropping of a jetting failure nozzle is executed using a normal nozzle located in the vicinity of the jetting failure nozzle. The jetting failure nozzle referred to here may include an abnormal nozzle that cannot execute normal ink jetting.

The printing control unit 178 comprises a drive voltage generation unit. The drive voltage generation unit generates a drive voltage that defines the jetting timing and the ink jetting amount of the ink jet head 122C and the like. The printing control unit 178 comprises a drive voltage supply unit. The drive voltage supply unit supplies the drive voltage to the ink jet head 122C and the like.

The imaging control unit 180 controls the operation of the imaging section 130 on the basis of the command signal transmitted from the integrated control unit 174. The imaging control unit 180 executes reading the printed matter using the scanner 132 during a period in which the printed matter passes through an imaging region of the scanner 132.

The drying control unit 182 controls the operation of the drying section 140 on the basis of the command signal transmitted from the integrated control unit 174. The drying control unit 182 controls the operation of the heater 142 on the basis of preset drying conditions. Accordingly, the drying section 140 heats the printed matter that passes through a heating processing region of the heater 142.

The sorting control unit 184 controls the operation of the sorting section 150 on the basis of the command signal transmitted from the integrated control unit 174. The sorting control unit 184 sorts the printed matter into good products and defective products on the basis of the defect information of the printed matter output from the printed matter inspection device 10. The sorting control unit 184 operates the stamper 152 to execute stamping processing on the printed matter passing through a stamping processing region of the stamper 152 in a case where the printed matter is a defective product.

The paper ejection control unit 186 controls the loading of the printed matter using the paper ejection tray 162 provided in the paper ejection section 160 on the basis of the command signal transmitted from the integrated control unit 174. In a case where the printed matter ejected and loaded on the paper ejection tray 162 is a defective product, the ink adheres to a tip edge of the printed matter. The operator can identify the defective product from the printed matter loaded on the paper ejection tray 162.

The printing apparatus 100 comprises the printed matter inspection device 10. The integrated control unit 174 controls the printed matter inspection device 10. The imaging data acquisition unit 12 provided in the printed matter inspection device 10 can acquire output signals of the scanner 132 as the imaging data. The print data acquisition unit 14 provided in the printed matter inspection device 10 acquires the print data.

The integrated control unit 174 acquires the defect information of the printed matter from the printed matter inspection device 10. The integrated control unit 174 transmits the defect information of the printed matter acquired from the printed matter inspection device 10 to the sorting control unit 184. The sorting control unit 184 uses the defect information of the printed matter to execute the sorting control of the printed matter.

Hardware Configuration of Printing Apparatus and Printed Matter Inspection Device The processing units shown in FIGS. 1 and 5 can execute specified programs and realize specified functions by using the hardware described below. Various processors may be applied as the hardware of the respective processing units. Examples of the processors include a central processing unit (CPU) and a graphics processing unit (GPU). The CPU is a general-purpose processor that executes the programs and functions as the respective processing units. The GPU is a processor specialized in the image processing. An electric circuit in which electric circuit elements such as semiconductor elements are combined together is applied as the hardware of the processor. Each control unit comprises a read only memory (ROM) in which a program or the like is stored and a random access memory (RAM) that is a work area for various operations or the like.

Two or more processors may be applied to one processing unit. The two or more processors may be the same type of processor or different types of processors. Additionally, one processor may be applied to a plurality of processing units.

Specific Example of Printing Section

Next, a specific example of the printing section 120 shown in FIG. 4 will be described.

Printing Section Comprising Line Head

Figure 6:
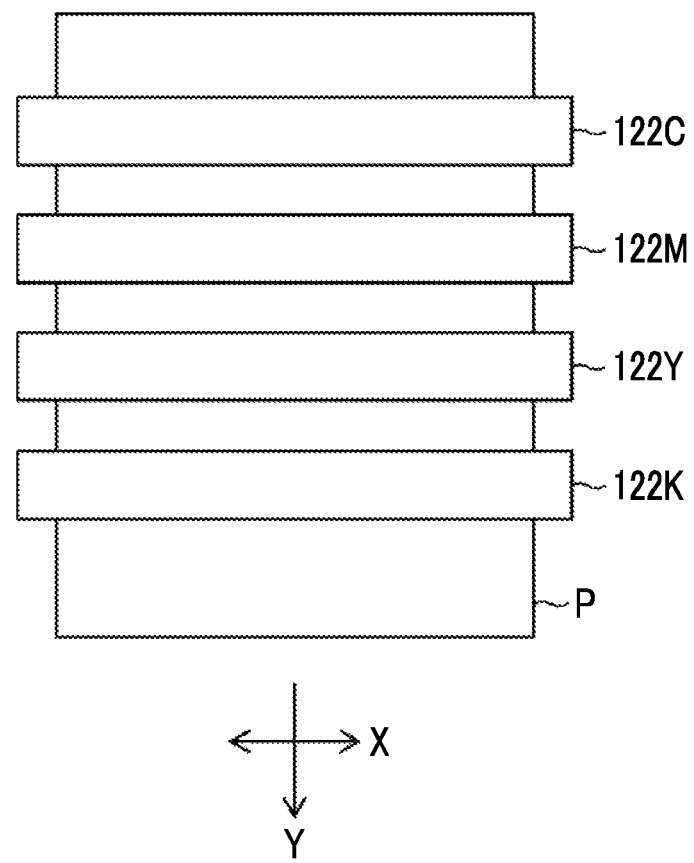
FIG. 6 is a configuration diagram of a printing section in which a line head is applied.

FIG. 6 is a configuration diagram of a printing section in which a line head is applied. As the ink jet head 122C shown in FIG. 6, a line head in which nozzles are arranged over a length corresponding to the total length of the paper P is applied in a paper width direction orthogonal to the paper transport direction. The same applies to the ink jet head 122M, the ink jet head 122Y, and the ink jet head 122K. In addition, reference numeral X shown in FIG. 6 indicates the paper width direction. The same applies to the following description.

Here, the term "orthogonal" in the present specification may include "substantially orthogonal" in which the same operational effects as those in a case where two directions are orthogonal to each other, in a case where the two directions intersect each other at less than 90 degrees or in a case where the two directions intersect each other at more than 90 degrees. The term "parallel" may include substantially parallel similar to orthogonal.

Figure 7:
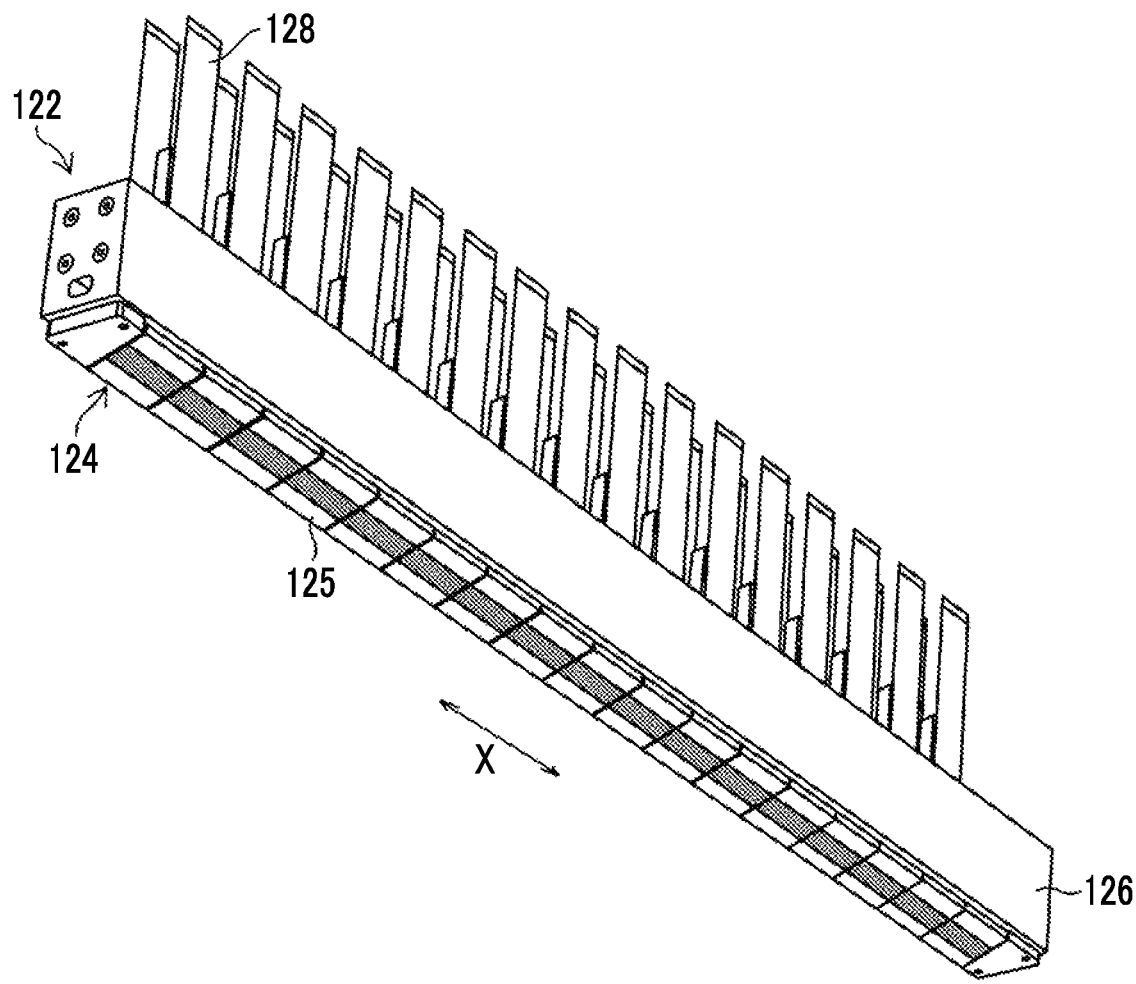
FIG. 7 is a perspective view showing a configuration example of the line head shown in FIG. 6.

FIG. 7 is a perspective view showing a configuration example of the line head shown in FIG. 6. In the following description, the ink jet head 122C, the ink jet head 122M, the ink jet head 122Y, and the ink jet head 122K are collectively referred to as the ink jet head 122.

The ink jet head 122 shown in FIG. 7 has a structure in which a plurality of head modules 124 are arranged in a row in a longitudinal direction of the ink jet head 122. The longitudinal direction of the ink jet head 122 corresponds to the paper width direction in a state where the ink jet head 122 is mounted on the printing apparatus 100.

The plurality of head modules 124 are integrated and supported by using a support frame 126. A flexible substrate 128 is attached to the head module 124 on a side opposite to a nozzle surface 125.

The line head is also referred to as a full line head, a line-type head, and a page wide head. The configuration of the line head shown in FIG. 7 is an example. The line head is not limited to an aspect comprising the plurality of head modules 124. Additionally, the arrangement of the plurality of head modules 124 is not limited to an aspect shown in FIG. 7.

Figure 8:
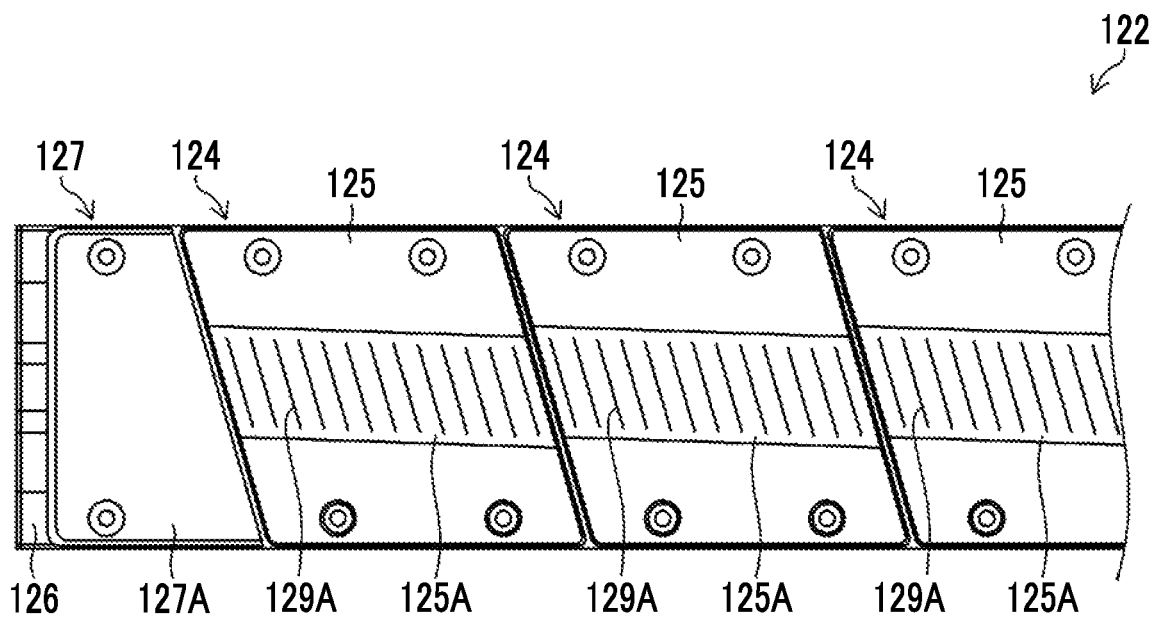
FIG. 8 is an enlarged view of a nozzle surface of the line head shown in FIG. 7.

FIG. 8 is an enlarged view of the nozzle surface of the line head shown in FIG. 7. The nozzle surface 125 of the head module 124 has a parallelogram shape. Dummy plates 127 are attached to both ends of the support frame 126. The nozzle surface 125 of the ink jet head 122 has an oblong shape as a whole together with a front surface 127A of each dummy plate 127.

A belt-shaped nozzle arrangement part 125A is provided at a central portion of the nozzle surface 125 of the head module 124. The nozzle arrangement part 125A functions as a substantial nozzle surface 125. Nozzles are provided in the nozzle arrangement part 125A. In addition, in FIG. 8, the nozzles are not shown individually, but nozzle lines 129A including a plurality of nozzles are shown.

Figure 9:
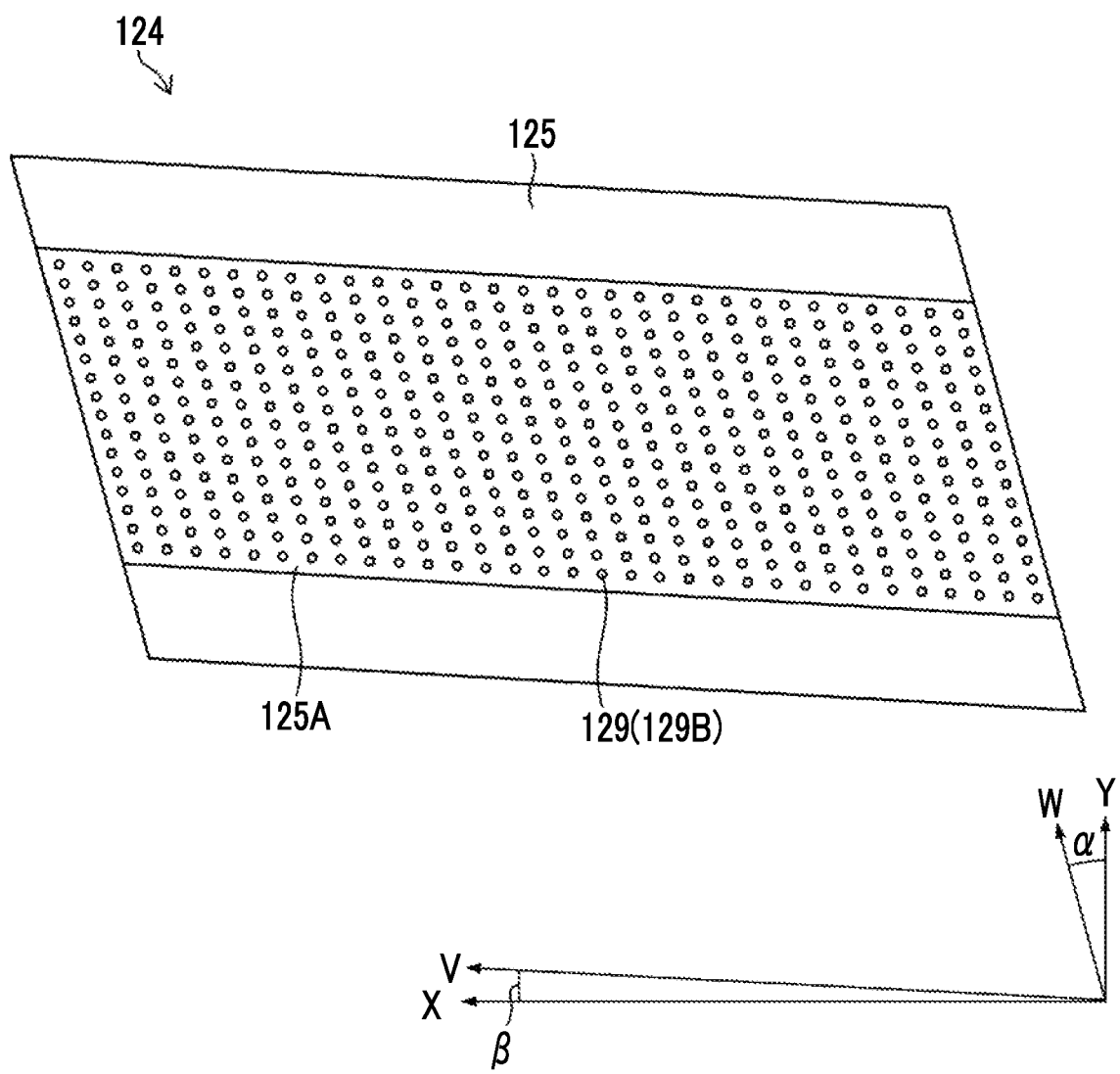
FIG. 9 is a plan view showing an example of nozzle arrangement of the line head shown in FIG. 7.

FIG. 9 is a plan view showing an example of nozzle arrangement of the line head shown in FIG. 7. A two-dimensional arrangement is applied to the nozzle surface 125 of the head module 124 to arrange a plurality of nozzle openings 129B.

The head module 124 has a parallelogram planar shape having an end surface on a long side in a V direction having an inclination of an angle β with respect to the paper width direction and an end surface on a short side in a W direction having an inclination of an angle α with respect to the paper transport direction.

In the head module 124, the plurality of nozzle openings 129B are arranged in a matrix in a row direction along the V direction and a column direction along the W direction. The nozzle openings 129B may be arranged in a row direction along the paper width direction and a column direction obliquely intersecting the paper width direction.

In the case of the ink jet head in which the plurality of nozzles 129 are arranged in a matrix, it can be considered that a projection nozzle line in which the respective nozzles 129 in a matrix arrangement are projected in a nozzle line direction is equivalent to one nozzle line in which the respective nozzles 129 are lined up at approximately regular intervals with a density such that a maximum recording resolution is achieved in the nozzle line direction. The projection nozzle line is a nozzle line in which the respective nozzles 129 in a two-dimensional nozzle arrangement is orthographically projected in the nozzle line direction.

The "approximately regular intervals" means that droplet striking points capable of being recorded in the printing apparatus 100 have substantially regular intervals. For example, even a case where a slightly different interval is included in consideration of at least one of manufacturing error or movement of liquid droplets on the paper P due to landing interference is included in the concept of the regular intervals. The projection nozzle line corresponds to a substantial nozzle line. Considering the projection nozzle line, it is possible to associate each nozzle with a nozzle number indicating a nozzle position in line-up order of the projection nozzles lined up in the nozzle line direction. In addition, in FIG. 9, the illustration of the projection nozzle line is omitted.

The arrangement form of the nozzles 129 of the ink jet head 122 is not limited, and the arrangement form of various nozzles 129 can be adopted. For example, instead of a matrix-shaped two-dimensional arrangement form, a single-line linear arrangement, a V-shaped nozzle arrangement, and a polygonal-lined nozzle arrangement such as a W-shaped arrangement having a V-shaped array as a repeating unit are also available. In addition, the nozzles 129 comprise the nozzle openings 129B shown in FIG. 9. The above-described arrangement of the nozzles 129 may be read as the arrangement of the nozzle openings 129B. The same applies to the following description.

Each nozzle 129 comprises a flow passage that communicates with each of the plurality of nozzle openings 129B and the plurality of nozzle openings 129B. The ink jet head 122 comprises a pressurizing element corresponding to each of the plurality of nozzles 129. A piezoelectric element and a heating element may be applied as the pressurizing element. In addition, the illustration of the flow passage, the piezoelectric element, and the heating element is omitted.

That is, a piezo jet method comprising the piezoelectric element as the pressurizing element may be applied to the ink jet head 122. A thermal method comprising the heating element as the pressurizing element may be applied to the ink jet head 122. The same applies to a serial head described below.

Printing Section Comprising Serial Head

Figure 10:
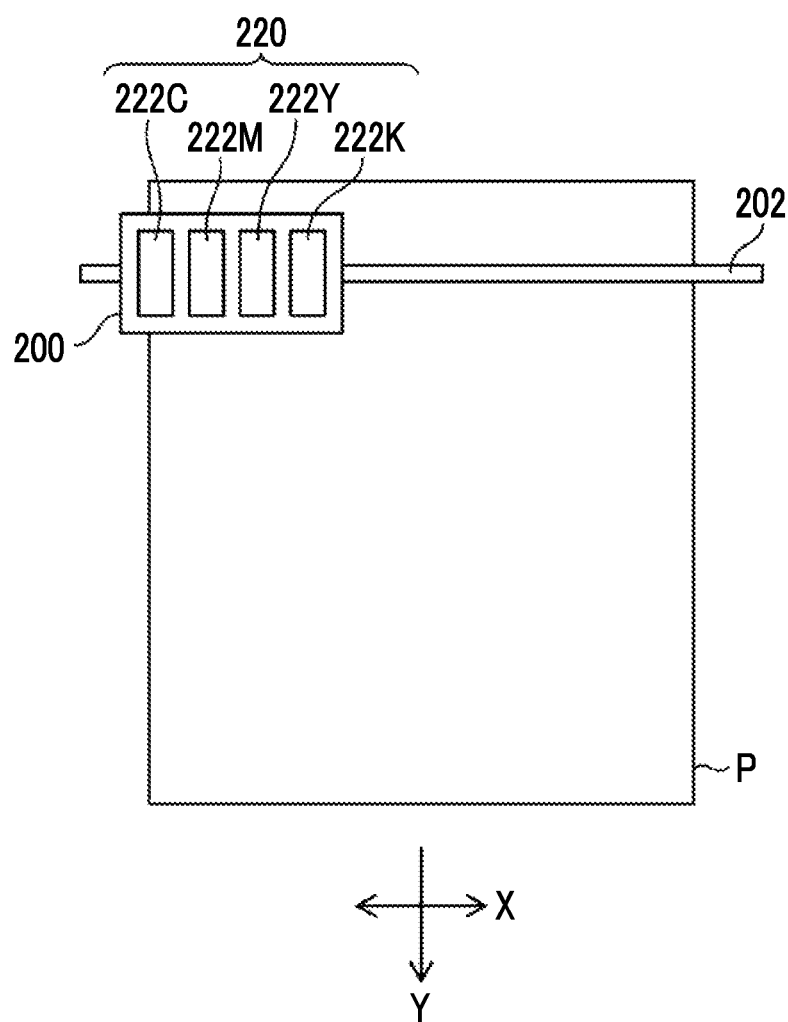
FIG. 10 is a configuration diagram of a printing section in which a serial head is applied.

FIG. 10 is a configuration diagram showing a configuration example of the printing section in which the serial head is applied. A serial head in which a plurality of nozzles are arranged in the paper transport direction is applied as each of an ink jet head 222C, an ink jet head 222M, an ink jet head 222Y, and an ink jet head 222K shown in FIG. 10. In addition, in FIG. 10, the illustration of the plurality of nozzles is omitted. The plurality of nozzles are designated by reference numeral 229 and are shown in FIG. 11.

The ink jet head 222C, the ink jet head 222M, the ink jet head 222Y, and the ink jet head 222K are mounted on a carriage 200 that reciprocates in the paper width direction. The carriage 200 is supported so as to be reciprocally movable along the paper width direction by using a guide 202.

The printing section 220 comprises the serial head executes scanning with the carriage one or more times to execute printing of one pass having a certain length in the paper transport direction, and transports the paper depending on the printing of one pass to execute printing of a plurality of passes to print one image.

Figure 11:
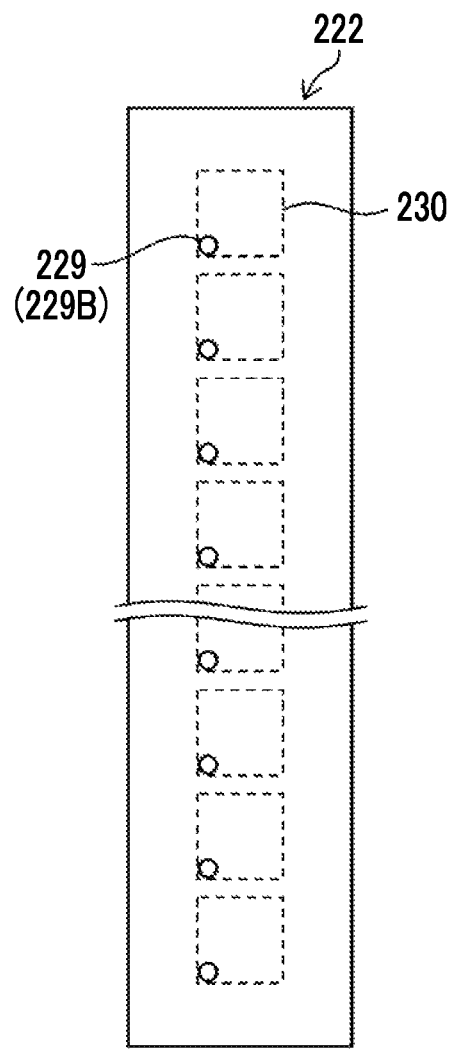
FIG. 11 is an enlarged view of a nozzle surface of the serial head shown in FIG. 10.

FIG. 11 is an enlarged view of a nozzle surface of the serial head shown in FIG. 10. In the following description, the ink jet head 222C, the ink jet head 222M, the ink jet head 222Y, and the ink jet head 222K are collectively referred to as the ink jet head 222.

In the ink jet head 222, a plurality of nozzle openings 229B are arranged in the longitudinal direction. Although an aspect in which the plurality of nozzle openings 229B can be arranged in a line is exemplified in FIG. 11, the plurality of nozzle openings 229B may be arranged in two lines in a zigzag manner.

Reference numeral 230 in FIG. 11 represents a pressure chamber that communicates with each nozzle opening 229B. The nozzle opening 229B communicates with the pressure chamber 230 via a flow passage. The ink jet head 222 pressurizes the ink contained in the pressure chamber 230 and jets ink liquid droplets from the nozzle opening. In addition, reference numeral 229 indicates a nozzle.

Explanation of Streak Defect Occurring in Printed Matter

An example of the defect in the printed matter includes a streak defect. The streak defect may occur in a direction orthogonal to a direction in which the plurality of nozzles are arranged, due to the jetting abnormality of a nozzle. A visually recognized streak defect deteriorates the quality of the printed matter. The streak defect occurs due to the nozzle in which the jetting abnormality has occurred. The streak defect for each printing method will be described below.

In Case of Line Head

Figure 12:
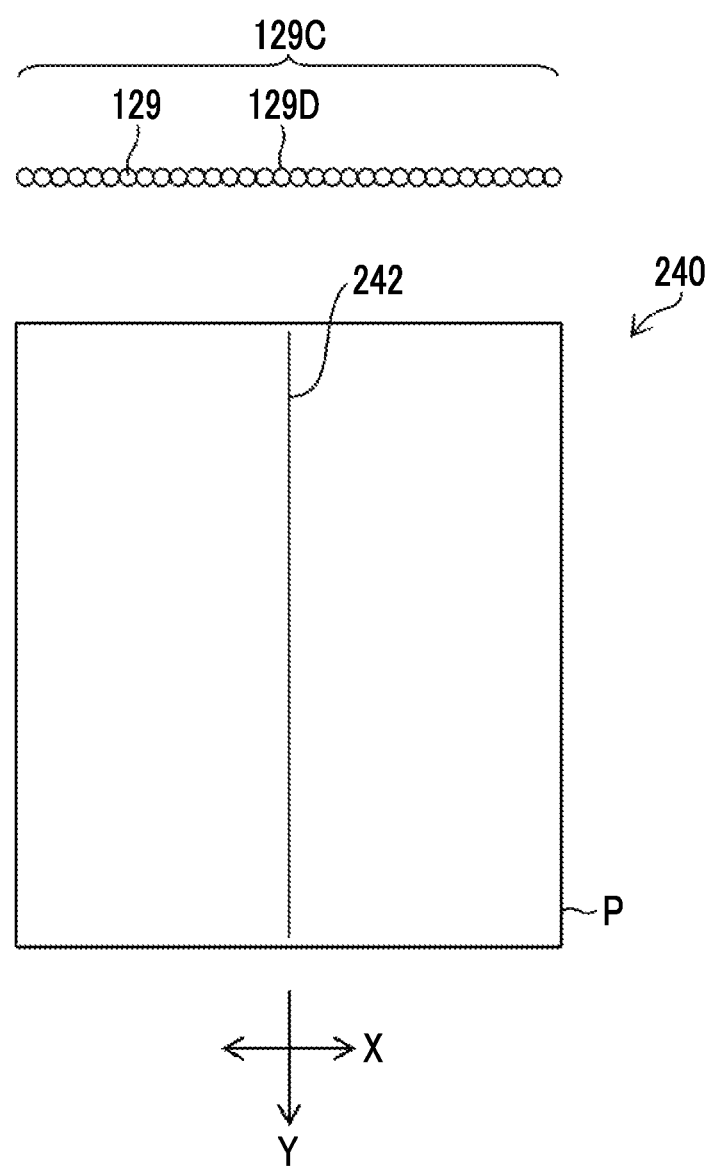
FIG. 12 is an explanatory diagram of a streak defect in the printed matter generated by using the printing section in which the line head is applied.

FIG. 12 is an explanatory diagram of a streak defect in the printed matter generated by using the printing section in which the line head is applied. Reference numeral 129C indicates a projection nozzle line in which the matrix-arranged nozzles 129 shown in FIG. 9 are projected in the paper width direction. The projection nozzle line 129C shown in FIG. 12 is a substantial nozzle arrangement of the matrix-arranged nozzles 129 shown in FIG. 9.

A nozzle 129D is a jetting failure nozzle. A printed matter 240 in which an image is printed on the paper P has a streak defect 242 at the printing position of the nozzle 129D. In addition, the illustration of the image of the printed matter 240 is omitted. In printing using the line head, the streak defect 242 that is parallel to the paper transport direction and has a length corresponding to the printing range of the nozzle 129D in the paper transport direction may occur. In addition, the paper transport direction in a case where the line head is provided corresponds to an example of a relative transport direction between the printing section and the medium.

In Case of Serial Head

Figure 13:
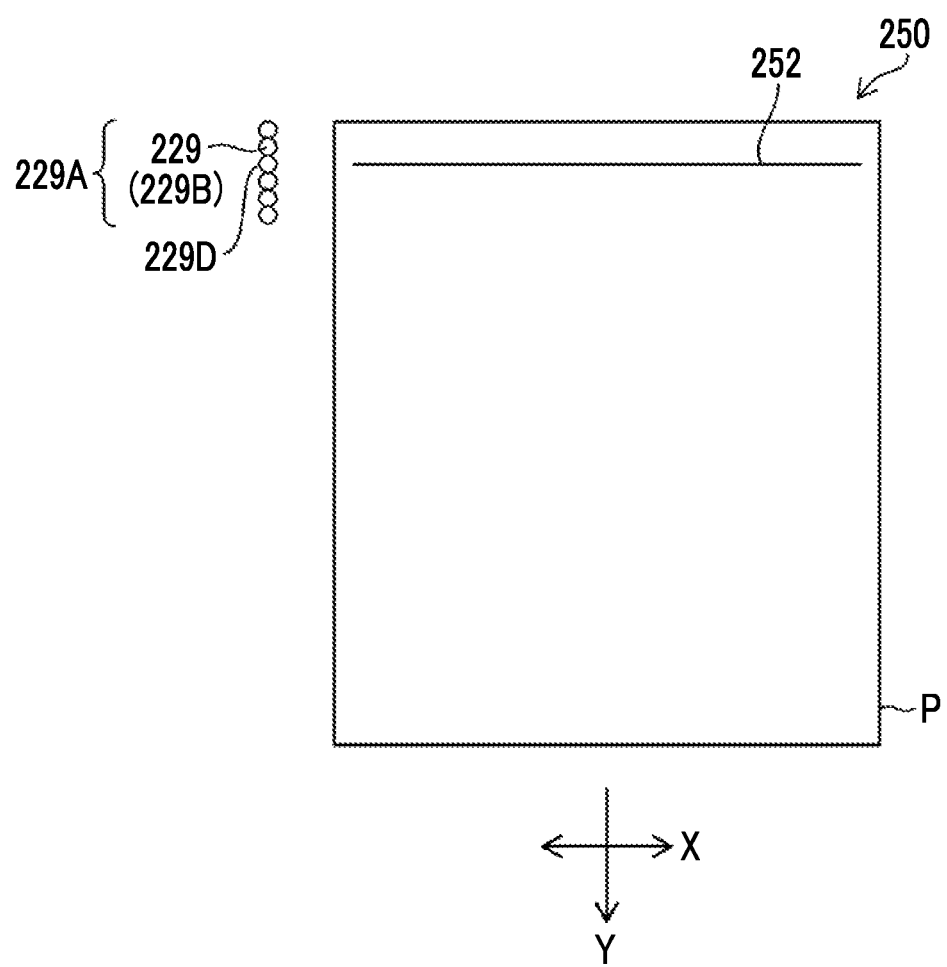
FIG. 13 is an explanatory diagram of a streak defect in the printed matter generated by using the printing section in which the serial head is applied.

FIG. 13 is an explanatory diagram of a streak defect in the printed matter generated by using the printing section in which the serial head is applied. A plurality of nozzles 229 shown in FIG. 13 correspond to the plurality of nozzle openings 229B shown in FIG. 11. Reference numeral 229A indicates a nozzle line having a plurality of nozzles 229 as components.

A nozzle 229D is a jetting failure nozzle. A printed matter 250 in which an image is printed on the paper P has a streak defect 252 at the printing position of the nozzle 229D. In addition, the illustration of the image of the printed matter 250 is omitted. The streak defect 252 is parallel to the scanning direction of the carriage 200 shown in FIG. 10 and has a length corresponding to the printing range of the nozzle 129D in the scanning direction of the carriage 200. In addition, the scanning direction of the carriage 200 in a case where the serial head is provided corresponds to an example of the relative transport direction between the printing section and the medium.

Detailed Description of Deep Learning Model

Figure 14:
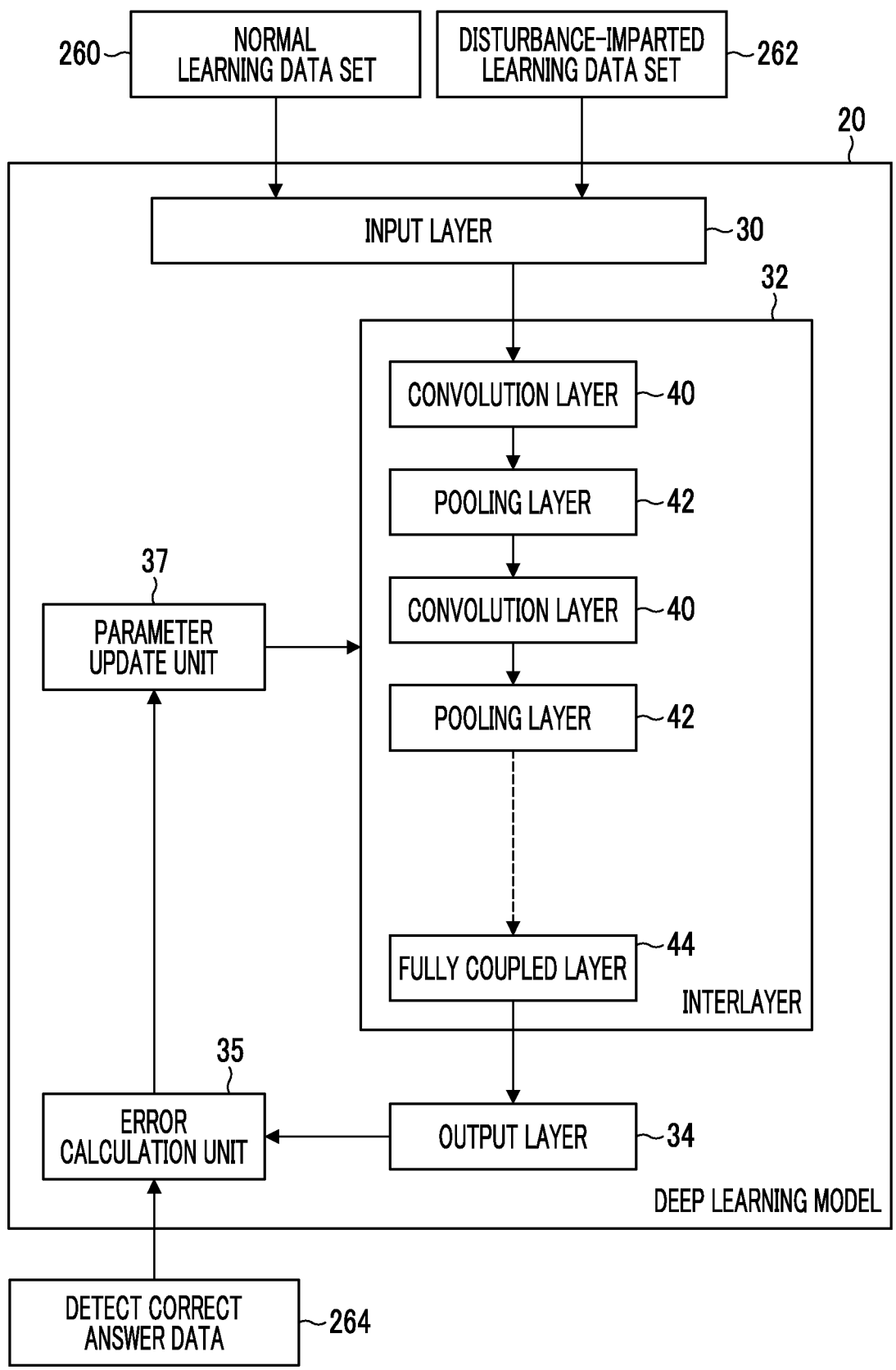
FIG. 14 is an explanatory diagram of a deep learning model.

FIG. 14 is an explanatory diagram of a deep learning model. In the deep learning model 20 shown in the present embodiment, learning is executed using a disturbance-imparted learning data set 262 in which a disturbance is added. Accordingly, robustness against the disturbance is obtained. A defect, which is an inspection target, is a streak defect occurring in the printed matter, and the disturbance is the misregistration of the imaging data with respect to the print data in the direction orthogonal to the streak defect.

Generally, a matching technique for finding a position where an error is minimized in a case where pixels are shifted within a search range is applied as the registration between the print data and the imaging data. The accuracy of the registration processing and the period of the registration processing tend to be in a trade-off relationship. In a case where the printed matter inspection device 10 executes a printed matter inspection in real time, the period of the registration processing may be limited depending on the limitation of an inspection period, and it may be difficult to maintain the registration accuracy.

On the other hand, even in a case where the period of the registration processing is not limited, perfect registration may be difficult and slight misregistration may occur. In such a case, in a case where only the learning data that has undergone ideal registration processing is used for learning, robustness against the error of the registration processing cannot be obtained, and misregistration in a pattern having an image structure similar to a streak defect such as a barcode or a lattice is erroneously detected as the streak defect.

Thus, in the learning of the deep learning model 20 shown in the present embodiment, the imaging data in which the position is intentionally shifted with respect to the print data in the direction orthogonal to the direction of the streak defect is applied to the learning data to obtain the robustness against the misregistration.

That is, in the learning of the deep learning model 20 shown in FIG. 14, a normal learning data set 260 and a disturbance-imparted learning data set 262 are input. Defect correct answer data 264 is input to the deep learning model 20. The defect correct answer data 264 is included in the normal learning data set 260 and the disturbance-imparted learning data set 262.

In the learning of the deep learning model 20, the normal learning data set 260 and the disturbance-imparted learning data set 262 are input, and the defect information of each is output. An error calculation unit 35 compares the defect information output from the output layer 34 with the defect correct answer data 264 and outputs error information.

The error information is transmitted to a parameter update unit 37. The parameter update unit 37 updates the parameters applied to the interlayer 32 on the basis of the error information. The deep learning model 20 executes learning until a specified accuracy is achieved.

The normal learning data set 260 comprises the print data and the imaging data. The normal learning data set 260 corresponds to the learning data that has undergone the above-described ideal registration. The disturbance-imparted learning data set 262 comprises the print data and disturbance-imparted imaging data. The disturbance-imparted imaging data is imaging data of which the position is shifted in a direction orthogonal to the direction of the streak defect with respect to the print data. In addition, the print data of the normal learning data set 260 may be applied as the print data of the disturbance-imparted learning data set 262.

The disturbance-imparted imaging data is generated by shifting the position of each pixel between one pixel and three pixels in a case where the shift of up to three pixels occurs in the registration processing between the print data and the imaging data. That is, the disturbance-imparted imaging data is generated by shifting the position of the imaging data with respect to the print data step by step within the range of the registration accuracy between the print data and the imaging data. The acquisition of the disturbance-imparted learning data set 262 shown in the present embodiment may include the generation of the disturbance-imparted learning data set 262 that generates the disturbance-imparted imaging data from the imaging data.

The deep learning model 20 executes the learning in which the disturbance-imparted learning data set 262 is applied, to obtain the robustness against the misregistration between the print data and the imaging data. Accordingly, erroneous detection of a streak defect caused by the misregistration between the print data and the imaging data can be avoided. Additionally, the detection accuracy of a streak defect can be reduced to achieve the speed-up of the inspection of the printed matter.

The normal learning data set 260 and the disturbance-imparted learning data set 262 include the print data. The defect information of the printed matter is generated in the imaging data but not in the print data. In a case where the learning of extracting a defective structure is executed and in a case where only the imaging data is used, there is a possibility that a pattern structure similar to the defective structure will be recognized as a defective structure. Thus, by including the print data in the normal learning data set 260 and the disturbance-imparted learning data set 262, the performance of the deep learning model 20 can be improved.

In addition, the deep learning model 20 described in the embodiment corresponds to an example of a learning model in which the relationship between a defect candidate detected from the imaging data and a defect in the printed matter is learned.

Procedure of Learning Method

Figure 15:
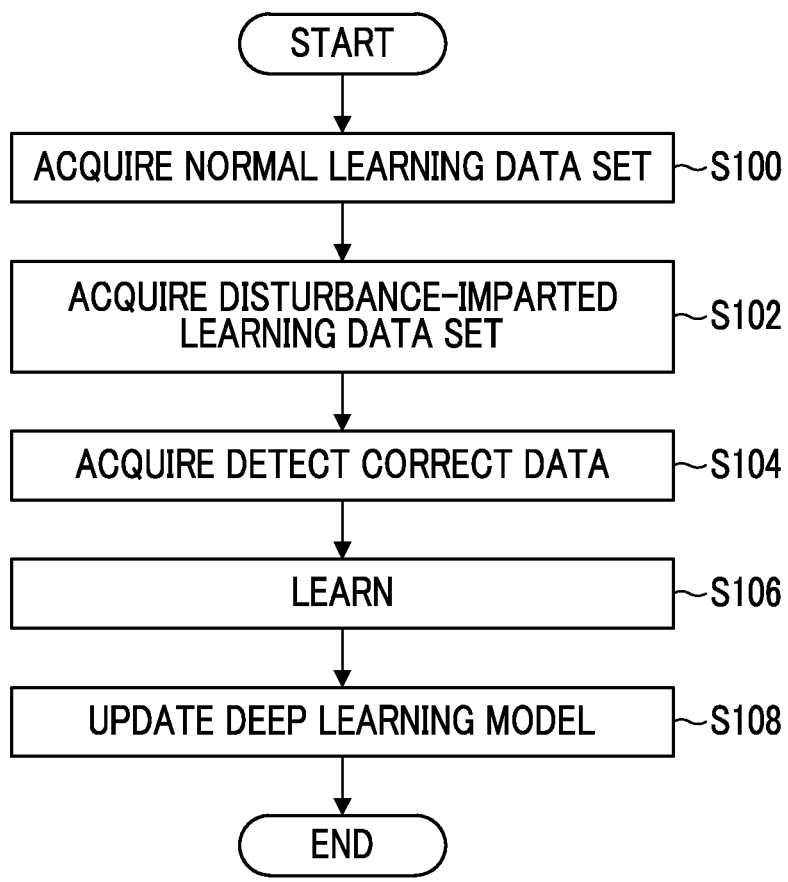
FIG. 15 is a flowchart showing a procedure of a learning method applied to the deep learning model shown in FIG. 14.

FIG. 15 is a flowchart showing a procedure of a learning method applied to the deep learning model shown in FIG. 14. In a normal learning data set acquisition step S100, the input layer 30 acquires the normal learning data set 260. After the normal learning data set acquisition step S100, the process proceeds to a disturbance-imparted learning data set acquisition step S102.

In the disturbance-imparted learning data set acquisition step S102, the input layer 30 acquires the disturbance-imparted learning data set 262. After the disturbance-imparted learning data set acquisition step S102, the process proceeds to a defect correct answer data acquisition step S104.

In addition, the disturbance-imparted learning data set acquisition step S102 may be executed before the execution of the normal learning data set acquisition step S100. The disturbance-imparted learning data set acquisition step S102 may be executed in parallel with the normal learning data set acquisition step S100.

In the defect correct answer data acquisition step S104, the deep learning model 20 acquires the defect correct answer data 264. A learning step S106 is executed after the defect correct answer data acquisition step S104. In addition, the defect correct answer data acquisition step S104 may be executed before the execution of at least one of the normal learning data set acquisition step S100 or the disturbance-imparted learning data set acquisition step S102.

The defect correct answer data acquisition step S104 may be executed in parallel with at least one of the normal learning data set acquisition step S100 or the disturbance-imparted learning data set acquisition step S102.

In the learning step S106, the deep learning model 20 executes learning using the normal learning data set 260 and the disturbance-imparted learning data set 262. The learning step S106 includes a defect information output step of outputting the defect information, an error calculation step of comparing the defect information with the defect correct answer data 264, and a parameter update step of updating the parameters applied to the interlayer 32 on the basis of the comparison result. After the learning step S106, the process proceeds to a deep learning model update step S108.

In the deep learning model update step S108, the deep learning model 20 is updated. After the deep learning model update step S108, the learning method is ended.

In the present embodiment, the learning using the normal learning data set 260 and the disturbance-imparted learning data set 262 in combination is exemplified. However, even in a case where the learning using only the disturbance-imparted learning data set 262 has been executed, it is possible to obtain a certain degree of robustness against the misregistration between the print data and the imaging data.

Direction in Which Position of Imaging Data is Shifted with Respect to Print Data The direction in which the position of the imaging data is shifted with respect to the print data may be a direction that obliquely intersects the direction of a streak defect, and the imaging data may be non-rotating with respect to the print data. The direction that intersects the direction of the streak defect may be a direction that intersects the relative transport direction between the printing section and the paper P.

Additionally, the direction orthogonal to the direction of the streak defect may be a substantial nozzle arrangement direction in the printing section. The relative transport direction between the printing section and the paper P and the substantial nozzle arrangement direction may be set depending on the printing method of the printing section.

Operational Effects

According to the printed matter inspection device 10, the printed matter inspection method, and the printing apparatus 100 according to the embodiment, the following operational effects can be obtained.

The presence/absence of a streak defect of the printed matter is inspected using a learned deep learning model that has executed learning having, as an input, the disturbance-imparted learning data set 262 including the disturbance-imparted imaging data of which the position is shifted with respect to the print data and having the defect information of the streak defect as an output. Accordingly, it is possible to obtain the robustness against the misregistration of the imaging data with respect to the print data in the printed matter inspection.

The disturbance-imparted learning data set 262 includes the disturbance-imparted imaging data of which the position is shifted with respect to the print data within the range of the registration accuracy between the print data and the imaging data. Accordingly, in the printed matter inspection, it is possible to obtain the robustness against the misregistration within the range of the registration accuracy between the print data and the imaging data.

The deep learning model 20 inputs the normal learning data set 260 including the imaging data that has undergone the ideal registration with respect to the print data. Accordingly, the accuracy of the deep learning model 20 can be improved.

The normal learning data set 260 and the disturbance-imparted learning data set 262 include the print data. Accordingly, the learning of extracting a difference between the imaging data and the print data can be executed, and the execution of the deep learning model 20 can be improved.

The misregistration of the imaging data with respect to the print data is in the direction orthogonal to the relative transport direction between the printing section and the paper. Accordingly, in the detection of a streak defect in the relative transport direction between the printing section and the paper, it is possible to obtain the robustness against the misregistration of the imaging data.

In a case where the printing section in which the line-type head is applied is provided, the robustness against the misregistration of the imaging data can be obtained in the detection of a streak defect in the paper transport direction.

In a case where the printing section in which the serial type head is applied is provided, the robustness against the misregistration of the imaging data can be obtained in the detection of a streak defect in the scanning direction of the carriage 200.

Application Example

Figure 16:
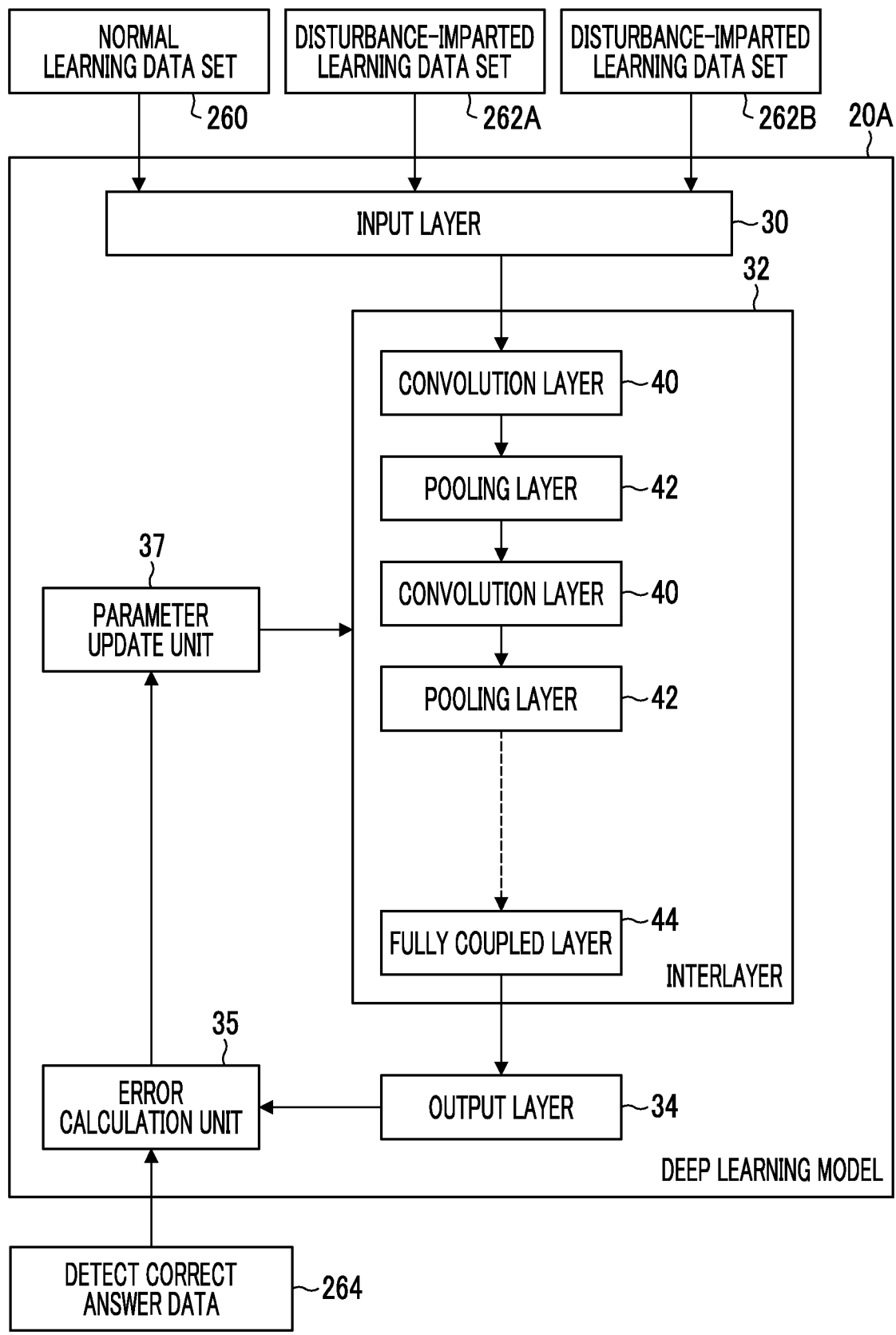
FIG. 16 is an explanatory diagram of a deep learning model according to an application example.

FIG. 16 is an explanatory diagram of a deep learning model according to an application example. In a deep learning model 20A provided in a printed matter inspection device according to the application example, learning using a first disturbance-imparted learning set 262A and a second disturbance-imparted learning set 262B in combination is executed.

While the print data does not change regardless of the state of the printing apparatus 100, the imaging data may have a change in the image structure of the print data such as a change in the dot pattern caused by the correction of the printing apparatus.

That is, a change in the image structure of the imaging data with respect to the print data may occur as a disturbance between the print data and the imaging data. It is possible to obtain the robustness against such a disturbance by executing learning using the imaging data in which the change in the image structure of the imaging data with respect to the print data is imparted as the disturbance.

The first disturbance-imparted learning set 262A shown in FIG. 16 corresponds to the disturbance-imparted learning data set 262 shown in FIG. 14. The second disturbance-imparted learning set 262B is imparted to the imaging data with the change in the image structure of the imaging data with respect to the print data as the disturbance.

The change in the image structure of the imaging data with respect to the print data may be caused by the change in the image structure of the printed matter with respect to the print data. Examples of such a case include the correction processing of the printing section, excessive or insufficient amount of ink of a specific color with respect to a specified amount, density unevenness, network type, noise caused by the surrounding environment of the printing apparatus, and the like.

Examples of the correction processing of the printing section include the jetting failure correction processing, nozzle jetting characteristic correction processing such as unevenness correction, color correction processing, and the like. An example of the excessive or insufficient amount of ink of the specific color with respect to the specified amount is ink loss of yellow or the like.

Examples of the density unevenness include transport unevenness of the paper P, speed unevenness of the carriage 200, and the like. Examples of the network type include AM screens, FM screens, hybrid screens, and the like. AM is an abbreviation for Amplitude Modulation. FM is an abbreviation for Frequency Modulation. In addition, the network is sometimes referred to as a halftone or the like.

Examples of the noise caused by the surrounding environment of the printing apparatus include noise caused by the ambient temperature of the printing apparatus and noise caused by the ambient humidity of the printing apparatus.

For example, the imaging data obtained by imaging the printed matter on which the jetting failure correction processing has been executed is visually inconspicuous, but the image structure thereof changes with respect to the print data. In the printed matter inspection, there is a possibility that such a change in the image structure is erroneously detected as a defective structure. Thus, the change in the image structure of the imaging data with respect to the print data caused by the jetting failure correction processing can be learned as a disturbance, and such erroneous detection can be avoided.

Similarly, the change in the image structure of the imaging data with respect to the print data caused by the correction of the jetting characteristics of the nozzles such as the unevenness correction and the correction processing of the printing section such as the color correction can be learned as a disturbance, and such erroneous detection can be avoided.

Additionally, the loss of yellow ink can be clearly checked in a blue channel of the imaging data, but there is a case where the loss cannot be visually recognized in the printed matter. A printed matter having a defective structure that cannot be visually recognized and a defective structure that is difficult to visually recognize may be determined to have no defective structure. Thus, the change in the image structure of the imaging data with respect to the print data caused by the insufficient amount of ink with respect to the specified amount such as the ink loss can be learned as a disturbance, and such erroneous detection can be avoided. An excess of the specified amount of ink can be dealt with in the same manner as the insufficiency of the specified amount of ink.

There is a case where the change in the image structure of the imaging data with respect to the print data is caused by the characteristics of the imaging device. An example of such a case includes an individual difference of an imaging element provided in the imaging device. An example of the individual differences in the imaging element includes a local change in resolving power in the imaging data caused by the MTF characteristic and the CTF characteristic of the imaging device. In addition, MTF is an abbreviation for Modulation Transfer Function. CTF is an abbreviation for Contrast Transfer Function.

Another example of such a case includes a difference in brightness between the edges and non-edges of the imaging data in a case where shading occurs in which the edges of the imaging data become dark and the printed matter is imaged using illumination of uniform brightness.

There is a case where the change in the image structure of the imaging data with respect to the print data is caused by the paper P applied to the printed matter. Examples of such a case include a change in the brightness of the imaging data depending on the type of the paper P, a stain on the paper P, and the like.

The change in the image structure of the imaging data with respect to the print data caused by the imaging device and in the image structure of the imaging data with respect to the print data caused by the paper P can also be learned as disturbances, and erroneous detection can be avoided.

The second disturbance-imparted imaging data set shown in FIG. 16 may be a combination of a plurality of disturbances. For example, the disturbance caused by the change in the image structure of the printed matter with respect to the print data and at least one of the disturbance caused by the characteristics of the imaging element or the disturbance caused by the paper P may be combined with each other. Additionally, a plurality of disturbances among the disturbances caused by the change in the image structure of the printed matter with respect to the print data may be combined with each other.

Operational Effects of Application Example

According to the printed matter inspection device according to the application example, the learning of the deep learning model 20A is executed by using the second disturbance-imparted learning set 262B including the second disturbance-imparted imaging data in which the disturbance caused by the change in the image structure of the imaging data with respect to the print data is imparted in combination with the first disturbance-imparted learning set 262A in which the disturbance caused by the misregistration of the imaging data with respect to the print data is imparted. Accordingly, the deep learning model 20A can obtain robustness against various disturbances.

Application Example of Printing Apparatus

As the transport method of the paper P of the printing apparatus 100, a transport method using a transport drum may be applied. As the printed matter inspection device 10 provided in the printing apparatus 100, an imaging device that radiates illumination light from a print surface of the printed matter to receive the reflected light of the illumination light may be applied, or an imaging device that radiates illumination light from a back surface of the print surface of the printed matter to receive the transmitted light of the illumination light may be applied.

Example of Application to Program Invention

A program corresponding to the printed matter inspection device and the printed matter inspection method disclosed in the present specification may be configured. That is, a program, which allows a computer to realize the functions of the respective units shown in FIG. 1 and the functions of the respective units (sections) shown in FIG. 5, can be configured.

For example, a program, which allows a computer to realize an imaging data acquisition function corresponding to the imaging data acquisition unit 12 shown in FIG. 1, a print data acquisition function corresponding to the print data acquisition unit 14, a registration processing function corresponding to the registration processing unit 15, an inspection processing function corresponding to the inspection processing unit 16, and an output function corresponding to the output unit 18, can be configured.

In the embodiment of the present invention described above, it is possible to appropriately change, add, or delete the configuration requirements without departing from the spirit of the present invention. The present invention is not limited to the embodiment described above, and many modifications can be made by a person having ordinary skill in the art within the technical idea of the present invention.

EXPLANATION OF REFERENCES

10: printed matter inspection device
12: imaging data acquisition unit
14: print data acquisition unit
16: inspection processing unit
18: output unit
20: deep learning model
20A: deep learning model
30: input layer
32: interlayer
35: error calculation unit
37: parameter update unit 40: convolution layer
42: pooling layer
44: fully coupled layer
100: printing apparatus
110: transport section
112: driven roller
114: drive roller
116: transport belt
120: printing section
122: ink jet head
122C: ink jet head
122M: ink jet head
122Y: ink jet head
122K: ink jet head
124: head module
125: nozzle surface
125A: nozzle arrangement part
126: support frame
127: dummy plate
127A: front surface
128: flexible substrate
129: nozzle
129A: nozzle line
129B: nozzle opening
129C: projection nozzle line
129D: jetting failure nozzle
130: imaging section
132: scanner
140: drying section
142: heater
150: sorting section
152: stamper
160: paper ejection section
162: paper ejection tray
170: user interface
172: storage unit
174: integrated control unit
176: transport control unit
178: printing control unit
180: imaging control unit
182: drying control unit
184: sorting control unit
186: paper ejection control unit
200: carriage
202: guide
220: printing section
222: ink jet head
222C: ink jet head
222M: ink jet head
222Y: ink jet head
222K: ink jet head
229: nozzle
229A: nozzle line
229B: nozzle opening
229D: jetting failure nozzle
230: pressure chamber
240: printed matter
242: streak defect
250: printed matter
252: streak defect
260: normal learning data set
262: disturbance-imparted learning data set
264: defect correct answer data
S10 to S16: respective steps of printed matter inspection method
S100 to S108: respective steps of learning method

What is claimed is:

1. A printed matter inspection device comprising one or more processors configured to:
acquire print data input to a printing apparatus in a case where a printed matter is generated;
acquire imaging data of the printed matter;
execute registration between the print data and the imaging data by applying a specified registration accuracy; and
perform inspection processing to acquire defect information of the imaging data on the basis of the print data by using the print data and the imaging data on which the registration has been executed,
wherein a learning model that has learned a relationship between a defect candidate detected from the imaging data and a defect in the printed matter is applied to the inspection processing, and
the learning model executes the learning by using a disturbance-imparted learning data set having, as an input, disturbance-imparted imaging data in which a disturbance that shifts a position of the imaging data within a range of the registration accuracy in a direction intersecting a relative transport direction between a printer and a medium in the printing apparatus is imparted, and having defect information of the disturbance-imparted imaging data as an output.

2. The printed matter inspection device according to claim 1,
wherein the learning model executes the learning by using the print data in combination as the disturbance-imparted learning data set.

3. The printed matter inspection device according to claim 1,
wherein the learning model executes learning using a learning data set having, as an input, the print data and the imaging data in which the disturbance is not applied, and having defect information of the imaging data as an output.

4. The printed matter inspection device according to claim 1,
wherein the one or more processors are configured to acquire the imaging data of the printed matter generated by using an ink jet printing apparatus.

5. The printed matter inspection device according to claim 4,
wherein the one or more processors are configured to acquire the defect information representing the defect that occurs in a direction intersecting an arrangement direction of a plurality of nozzles provided in the ink jet printing apparatus, and
the learning model executes learning using the disturbance-imparted imaging data in which the disturbance that shifts the position of the imaging data in the arrangement direction of the plurality of nozzles is imparted.

6. The printed matter inspection device according to claim 5,
wherein the learning model further executes learning using the disturbance-imparted imaging data in which a change in an image structure of the imaging data with respect to the print data is imparted as a disturbance.

7. The printed matter inspection device according to claim 6,
wherein the learning model executes learning using the disturbance-imparted imaging data in which the change in the image structure of the imaging data with respect to the print data caused by correction processing in the printing apparatus is imparted as the disturbance.

8. The printed matter inspection device according to claim 7,
wherein the learning model executes learning using the disturbance-imparted imaging data in which the change in the image structure of the imaging data with respect to the print data caused by jetting failure correction processing of the nozzles is imparted as the disturbance.

9. The printed matter inspection device according to claim 6,
wherein the learning model executes learning using the disturbance-imparted imaging data in which the change in the image structure of the imaging data with respect to the print data according to a type of network applied to the printing apparatus is imparted as the disturbance.

10. The printed matter inspection device according to claim 6,
wherein the learning model executes learning using the disturbance-imparted imaging data in which the change in the image structure of the imaging data with respect to the print data occurred depending on an individual difference of an imaging element provided in an imaging device for generating the imaging data is imparted as the disturbance.

11. The printed matter inspection device according to claim 10,
wherein the learning model executes learning using the disturbance-imparted imaging data in which the change in the image structure of the imaging data with respect to the print data according to a change in brightness of the imaging data is imparted as the disturbance.

12. The printed matter inspection device according to claim 6,
wherein the learning model executes learning using the disturbance-imparted imaging data in which the change in the image structure of the imaging data with respect to the print data according to a change in brightness of the imaging data according to a difference in the medium is imparted as the disturbance.

13. The printed matter inspection device according to claim 6,
wherein the learning model executes learning using the disturbance-imparted imaging data in which the change in the image structure of the imaging data with respect to the print data caused by a noise according to a surrounding environment of the printer is imparted as the disturbance.

14. The printed matter inspection device according to claim 13,
wherein the learning model executes learning using the disturbance-imparted imaging data in which the change in the image structure of the imaging data with respect to the print data caused by a noise according to an ambient temperature of the printer as the surrounding environment of the printer is imparted as the disturbance.

15. The printed matter inspection device according to claim 13,
wherein the learning model executes learning using the disturbance-imparted imaging data in which the change in the image structure of the imaging data with respect to the print data caused by a noise according to an ambient humidity of the printer as the surrounding environment of the printer is imparted as the disturbance.

16. The printed matter inspection device according to claim 6,
wherein the learning model executes learning using the disturbance-imparted imaging data in which the change in the image structure of the imaging data with respect to the print data caused by a change in amount of ink applied to one pixel with respect to a specified amount is imparted as the disturbance.

17. The printed matter inspection device according to claim 6,
wherein the learning model executes learning using the disturbance-imparted imaging data in which the change in the image structure of the imaging data with respect to the print data caused by a stain on the medium is imparted as the disturbance.

18. The printed matter inspection device according to claim 6,
wherein the learning model executes learning using the disturbance-imparted imaging data in which the change in the image structure of the imaging data with respect to the print data caused by an unevenness occurring in the printed matter is imparted as the disturbance.

19. A printed matter inspection method comprising:
acquiring print data input to a printing apparatus in a case where a printed matter is generated;
acquiring imaging data of the printed matter;
executing registration between the print data and the imaging data by applying a specified registration accuracy; and
performing inspection processing to acquire defect information of the imaging data on the basis of the print data by using the print data and the imaging data on which the registration has been executed,
wherein a learning model that has learned a relationship between a defect candidate detected from the imaging data and a defect in the printed matter is applied to the inspection processing, and
the learning model executes the learning by using a disturbance-imparted learning data set having, as an input, disturbance-imparted imaging data in which a disturbance that shifts a position of the imaging data within a range of the registration accuracy in a direction intersecting a relative transport direction between a printer and a medium in the printing apparatus is imparted, and having defect information of the disturbance-imparted imaging data as an output.

20. A non-temporary and computer-readable recording medium for causing a computer to execute the printed matter inspection method according to claim 19, in a case where a command stored in the recording medium is read by the computer.

21. A printing apparatus comprising:
one or more processors configured to acquire print data applied in a case where a printed matter is generated;
a transporter configured to transport a medium in a medium transport direction; and
a printer configured to execute printing based on the print data on the medium transported using the transporter,
wherein the one or more processors are further configured to:
acquire imaging data of the printed matter;
execute registration between the print data and the imaging data by applying a specified registration accuracy; and
perform inspection processing to acquire defect information of the imaging data on the basis of the print data by using the print data and the imaging data on which the registration has been executed, wherein a learning model that has learned a relationship between a defect candidate detected from the imaging data and a defect in the printed matter is applied to the inspection processing, and the learning model executes the learning by using a disturbance-imparted learning data set having, as an input, disturbance-imparted imaging data in which a disturbance that shifts a position of the imaging data within a range of the registration accuracy in a direction intersecting a relative transport direction between the printer and the medium is imparted, and having defect information of the disturbance-imparted imaging data as an output.

\* \* \* \* \*